US008559354B2

(12) United States Patent
Kwon et al.

(10) Patent No.: US 8,559,354 B2
(45) Date of Patent: Oct. 15, 2013

(54) METHOD AND APPARATUS OF TRANSMITTING DATA IN MBSFN SUBFRAME IN WIRELESS COMMUNICATION SYSTEM

(75) Inventors: Yeong Hyeon Kwon, Anyang-si (KR); Kyu Jin Park, Anyang-si (KR); Jae Hoon Chung, Anyang-si (KR); Min Seok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 13/143,714

(22) PCT Filed: Feb. 24, 2010

(86) PCT No.: PCT/KR2010/001150
§ 371 (c)(1),
(2), (4) Date: Jul. 7, 2011

(87) PCT Pub. No.: WO2010/098581
PCT Pub. Date: Sep. 2, 2010

(65) Prior Publication Data
US 2011/0299449 A1 Dec. 8, 2011

Related U.S. Application Data

(60) Provisional application No. 61/155,527, filed on Feb. 26, 2009.

(51) Int. Cl.
H04H 20/71 (2008.01)
(52) U.S. Cl.
USPC .......................................................... 370/312
(58) Field of Classification Search
None
See application file for complete search history.

(56) References Cited

U.S. PATENT DOCUMENTS

| | | | |
|---|---|---|---|
| 2009/0011767 A1* | 1/2009 | Malladi et al. | 455/450 |
| 2009/0022235 A1* | 1/2009 | Zhang et al. | 375/260 |
| 2009/0268624 A1* | 10/2009 | Imamura et al. | 370/252 |
| 2010/0014484 A1* | 1/2010 | Sudo et al. | 370/331 |
| 2010/0118803 A1* | 5/2010 | Ishii et al. | 370/329 |
| 2010/0220808 A1* | 9/2010 | Kishigami et al. | 375/295 |
| 2010/0296459 A1* | 11/2010 | Miki et al. | 370/329 |
| 2011/0085627 A1* | 4/2011 | Kangas et al. | 375/346 |
| 2011/0151913 A1* | 6/2011 | Forster et al. | 455/509 |

FOREIGN PATENT DOCUMENTS

| | | |
|---|---|---|
| EP | 1777873 | 4/2007 |
| EP | 1926235 | 5/2008 |
| KR | 1020080097143 | 11/2008 |

* cited by examiner

Primary Examiner — John Blanton
(74) Attorney, Agent, or Firm — Lee, Hong, Degerman, Kang & Waimey

(57) ABSTRACT

A method and apparatus of transmitting data in a Multimedia Broadcast multicast service Single Frequency Network (MB-SFN) subframe in a wireless communication system is provided. A base station (BS) transmits a physical downlink control channel (PDCCH) to a user equipment in a first orthogonal frequency division multiplexing (OFDM) symbol, transmits reference signals for a plurality of extended antenna ports to the user equipment in a second OFDM symbol by mapping the reference signals to subcarriers, and transmits a physical downlink shared channel (PDSCH) to the user equipment in the second OFDM symbol by mapping the PDSCH to the remaining subcarriers other than the subcarriers to which the reference signals are mapped.

7 Claims, 27 Drawing Sheets

Fig. 21

METHOD AND APPARATUS OF TRANSMITTING DATA IN MBSFN SUBFRAME IN WIRELESS COMMUNICATION SYSTEM

CROSS-REFERENCE TO RELATED APPLICATIONS

This application is a 371 U.S. national stage application of International Application No. PCT/KR2010/001150, filed on Feb. 24, 2010, which claims priority to U.S. Provisional Application Ser. No. 61/155,527, filed on Feb. 26, 2009, the contents of which are incorporated by reference herein in their entirety.

TECHNICAL FIELD

The present invention relates to wireless communications, and more particularly, to a method and apparatus of transmitting data in a Multimedia Broadcast multicast service Single Frequency Network (MBSFN) subframe in a wireless communication system.

BACKGROUND ART

The next-generation multimedia wireless communication systems which are being actively researched are required to process various pieces of information, such as video and wireless data, in addition to the early voice-centered service with a higher data transmission rate. The $4^{th}$ generation wireless communication systems which are now being developed, following the $3^{rd}$ generation wireless communication systems, are aiming at supporting the high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on. An OFDM system is being taken into consideration after the 3rd generation systems which are able to attenuate the ISI effect with low complexity. The OFDM system converts symbols, received in series, into N (N is a natural number) parallel symbols and transmits them on respective separated N subcarriers. The subcarriers maintain their orthogonality in the frequency domain. It is expected that the market for mobile communications will shift from the existing Code Division Multiple Access (CDMA) systems to OFDM-based systems. MIMO technology is used to improve the efficiency of data transmission and reception using multiple transmit antennas and multiple receive antennas. The MIMO technology includes spatial multiplexing, transmit diversity, beam-forming and the like. A MIMO channel matrix depending on the number of receive antennas and the number of transmit antennas can be decomposed into a number of independent channels. Each of the independent channels is referred to as a layer or a stream. The number of layers is referred to as a rank.

For the purpose of data transmission/reception, system synchronization acquisition, channel information feedback, or the like, there is a need to estimate an uplink channel or a downlink channel in a wireless communication system. In an environment of using the wireless communication system, fading occurs due to multi-path time delay. Channel estimation is a process of recovering a transmit signal by compensating for signal distortion which occurs when an environment changes rapidly due to fading. In general, the channel estimation is performed by using a reference signal (RS) known to both a transmitter and a receiver.

There are several methods proposed to extend the coverage of a base station (BS). One of them is a method of employing a relation station in the wireless communication system. For example, a relay station technique is one of main techniques for long term evolution (LTE)-advanced which is one of promising candidates of international mobile telecommunication (IMT)-advanced, i.e., a mobile communication system of a next generation (post-3rd generation).

The relay station is a device for relaying a signal between the BS and a user equipment (UE), and is used for cell coverage extension and throughput enhancement of the wireless communication system. An uplink and a downlink between the BS and the relay station are backhaul links, and an uplink and a downlink between the BS and the UE or between the relay station and the UE are access links. Hereinafter, a signal transmitted through the backhaul link is referred to as a backhaul signal, and a signal transmitted through the access link is referred to as an access signal.

In an LTE-advanced (LTE-A) system, an LTE-A UE and a legacy UE may be used together. In a subframe for the LTE-A, a radio resource for the LTE-A UE may be effectively used for various usages, whereas a radio resource for the legacy UE may not be used or may be easily wasted.

Accordingly, there is a need for a method for effectively utilizing resources for unused subframes.

SUMMARY OF INVENTION

Technical Problem

The present invention relates to a method and apparatus of transmitting data in a Multimedia Broadcast multicast service Single Frequency Network (MBSFN) subframe in a wireless communication system.

Solution to Problem

In an aspect, a method of transmitting data in a Multimedia Broadcast multicast service Single Frequency Network (MBSFN) subframe in a wireless communication system is provided. The method include transmitting a physical downlink control channel (PDCCH) to a user equipment in a first orthogonal frequency division multiplexing (OFDM) symbol, transmitting reference signals for a plurality of extended antenna ports to the user equipment in a second OFDM symbol by mapping the reference signals to subcarriers, and transmitting a physical downlink shared channel (PDSCH) to the user equipment in the second OFDM symbol by mapping the PDSCH to the remaining subcarriers other than the subcarriers to which the reference signals are mapped. The reference signals and the PDSCH may be scheduled by using a downlink control information (DCI) format transmitted through the PDCCH. The number of extended antenna ports may be 4 or 6. Each of the reference signals for the plurality of extended antenna ports may be subjected to frequency division multiplexing (FDM). Each of the reference signals for the plurality of extended antenna parts may be subjected to code division multiplexing (CDM). The reference signals for the plurality of extended antenna ports may be divided into a subset not having a common element when subjected to the CDM. The reference signals for the plurality of extended antenna ports may have a specific spacing from each other in a frequency domain.

In another aspect, a method of processing data in a Multimedia Broadcast multicast service Single Frequency Network (MBSFN) in a wireless communication system is provided. The method include decoding a physical downlink control channel (PDCCH) by receiving the PDCCH from a base station or a relay station in a first orthogonal frequency division multiplexing (OFDM) symbol, determining a length of a physical downlink shared channel (PDSCH) by a downlink (DL) grant transmitted on the PDCCH, and decoding the PDSCH by receiving the PDSCH in a second OFDM symbol. The length of the PDSCH may be one OFDM symbol.

In another aspect, a transmitter of a wireless communication system is provided. The transmitter include a radio frequency (RF) unit transmitting and receiving a signal, and a processor coupled to the RF unit and configured to transmit a physical downlink control channel (PDCCH) to a user equipment in a first orthogonal frequency division multiplexing (OFDM) symbol, transmit reference signals for a plurality of extended antenna ports to the user equipment in a second OFDM symbol by mapping the reference signals to subcarriers. The processor may further transmits a physical downlink shared channel (PDSCH) to the user equipment in the second OFDM symbol by mapping the PDSCH to the remaining subcarriers other than the subcarriers to which the reference signals are mapped. The reference signals and the PDSCH may be scheduled by using a downlink control information (DCI) format transmitted through the PDCCH.

Advantageous Effects of Invention

According to the present invention, resources can be effectively utilized when a Multimedia Broadcast multicast service Single Frequency Network (MBSFN) subframe is used to transmit a backhaul signal.

BRIEF DESCRIPTION OF DRAWINGS

FIG. 15 to FIG. 28 show another exemplary structure of a unicast part of an MBSFN subframe according to a data transmission method proposed in the present invention.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

Figure 1:
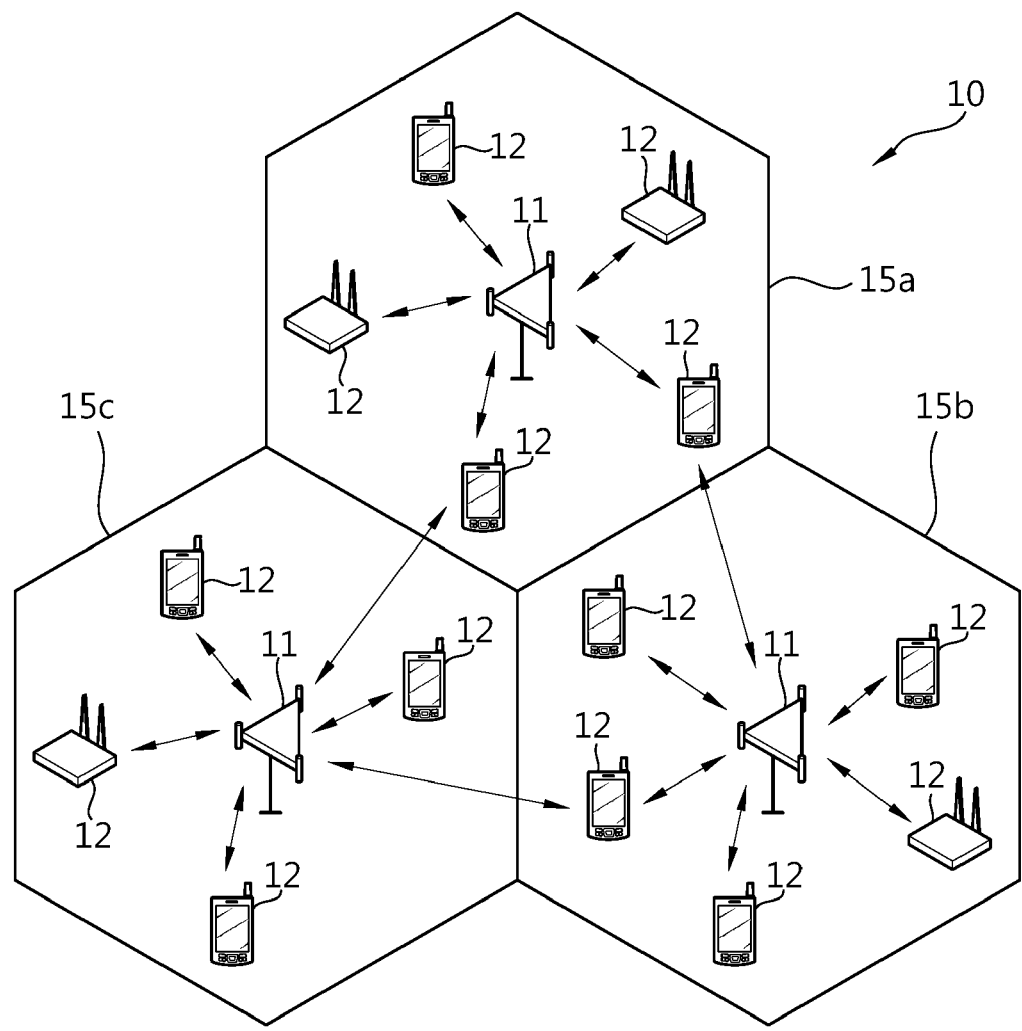
FIG. 1 shows a wireless communication system.

FIG. 1 shows a wireless communication system.

The wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
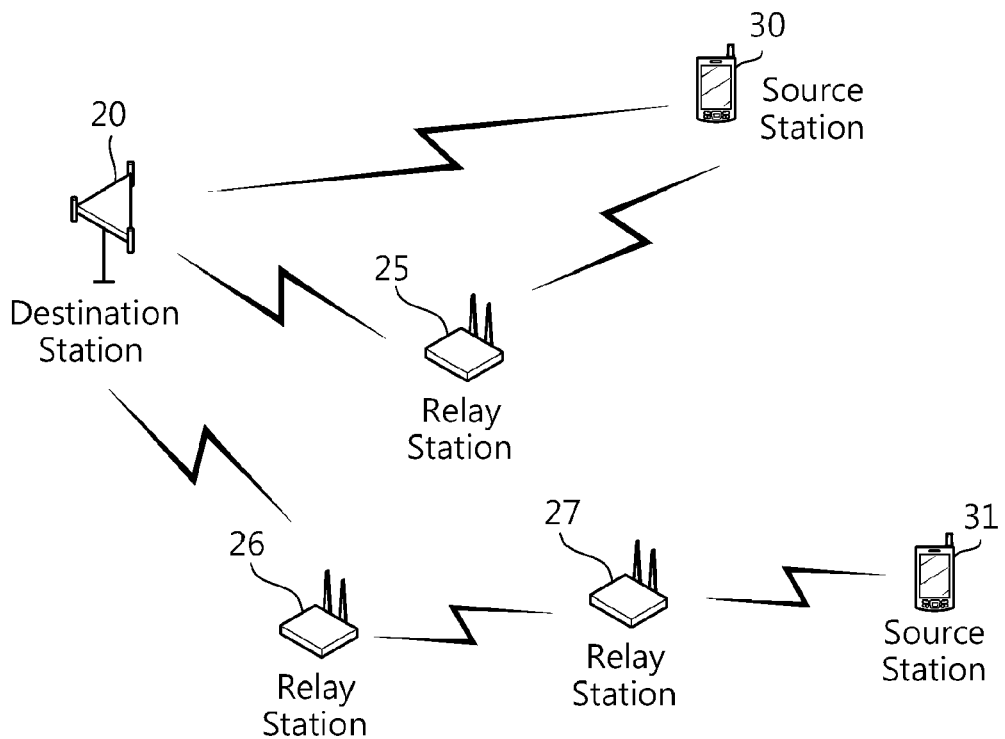
FIG. 2 shows a wireless communication system employing a relay station.

FIG. 2 shows a wireless communication system employing a relay station.

In uplink transmission, a user equipment (UE) may be a source station, and a base station (BS) may be a destination station. In downlink transmission, the BS may be the source station, and the UE may be the destination station. The relay station may be the UE, or may be provided as a separate relay station. The BS may perform functions such as connectivity, management, control, and resource allocation between the relay station and the UE.

Referring to FIG. 2, a destination station 20 communicates with a source station 30 via a relay station 25. In uplink transmission, the source station 30 transmits uplink data to the destination station 20 and the relay station 25, and the relay station 25 retransmits the received data. The destination station 20 also communicates with a source station 31 via relay stations 26 and 27. In uplink transmission, the source station 31 transmits uplink data to the destination station 20 and the relay station 26 and 27, and the relay stations 26 and 27 retransmit the received data simultaneously or in sequence.

Although one destination station 20, three relay stations 25, 26, and 27, and two source stations 30 and 31 are shown herein, the present invention is not limited thereto. The number of destination stations, relay stations, and source stations included in the wireless communication system is not limited to any particular number.

A relay scheme used in the relay station may be either amplify and forward (AF) or decode and forward (DF), and the technical features of the present invention are not limited thereto.

FIG. 2 shows the structure of a radio frame in the 3GPP LTE specifications. For the radio frame structure, reference can be made to Paragraph 5 of 3GPP ($3^{rd}$ Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 2, the radio frame includes ten subframes, and one subframe includes two slots. The slots within the radio frame are allocated slot numbers from #0 to #19. The time that it takes to transmit one subframe is called a Transmission Time Interval (TTI). The TTI can be called a scheduling unit for data transmission. For example, the length of one radio frame can be 10 ms, the length of one subframe can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of subframes included in a radio frame, the number of slots included in a subframe, or the number of OFDM symbols included in a slot can be changed in various ways.

In the 3GPP LTE specifications, one slot is defined to include seven OFDM symbols in a normal Cyclic Prefix (CP), and one slot is defined to include six OFDM symbols in the extended CP.

Figure 3:
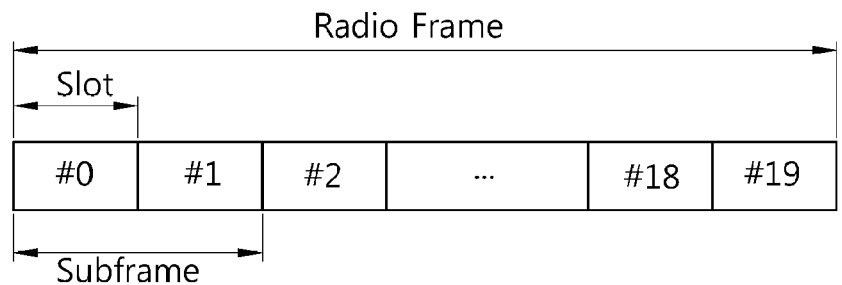
FIG. 3 shows a radio frame structure in a 3rd generation partnership project (3GPP) long term evolution (LTE).

FIG. 3 shows an example of a resource grid for one downlink slot.

The downlink slot includes a plurality of OFDM symbols in the time domain and $N_{RB}$ resource blocks in the frequency domain. The number of resource blocks $N_{RB}$ included in a downlink slot is dependent on a downlink transmission bandwidth set in a cell. For example, in the LTE system, the number of resource blocks $N_{RB}$ may be one of 60 to 110. One resource block includes a plurality of subcarriers in the frequency domain. The structure of an uplink slot can be identical with that of the downlink slot.

Each of elements on the resource grid is called a resource element. The resource element on the resource grid can be identified by an index pair (k, l) within a slot. Here, $k(k=0, \ldots, N_{RB} \times 12-1)$ denotes a subcarrier index in the frequency domain, and l ($l=0, \ldots, 6$) denotes an OFDM symbol index in the time domain.

In this case, one resource block is illustrated to include 7×12 resource elements, including 7 OFDM symbols in the time domain and 12 subcarriers in the frequency domain. However, the number of OFDM symbols and the number of subcarriers within a resource block are not limited to the 7×12 resource elements. The number of OFDM symbols and the number of subcarriers can be variously changed depending on the length of a CP, frequency spacing, and so on. For example, in the normal CP, the number of OFDM symbols can be 7, and in the extended CP, the number of OFDM symbols can be 6. In one OFDM symbol, the number of subcarriers can be one of 128, 256, 512, 1024, 1536, and 2048.

Figure 4:
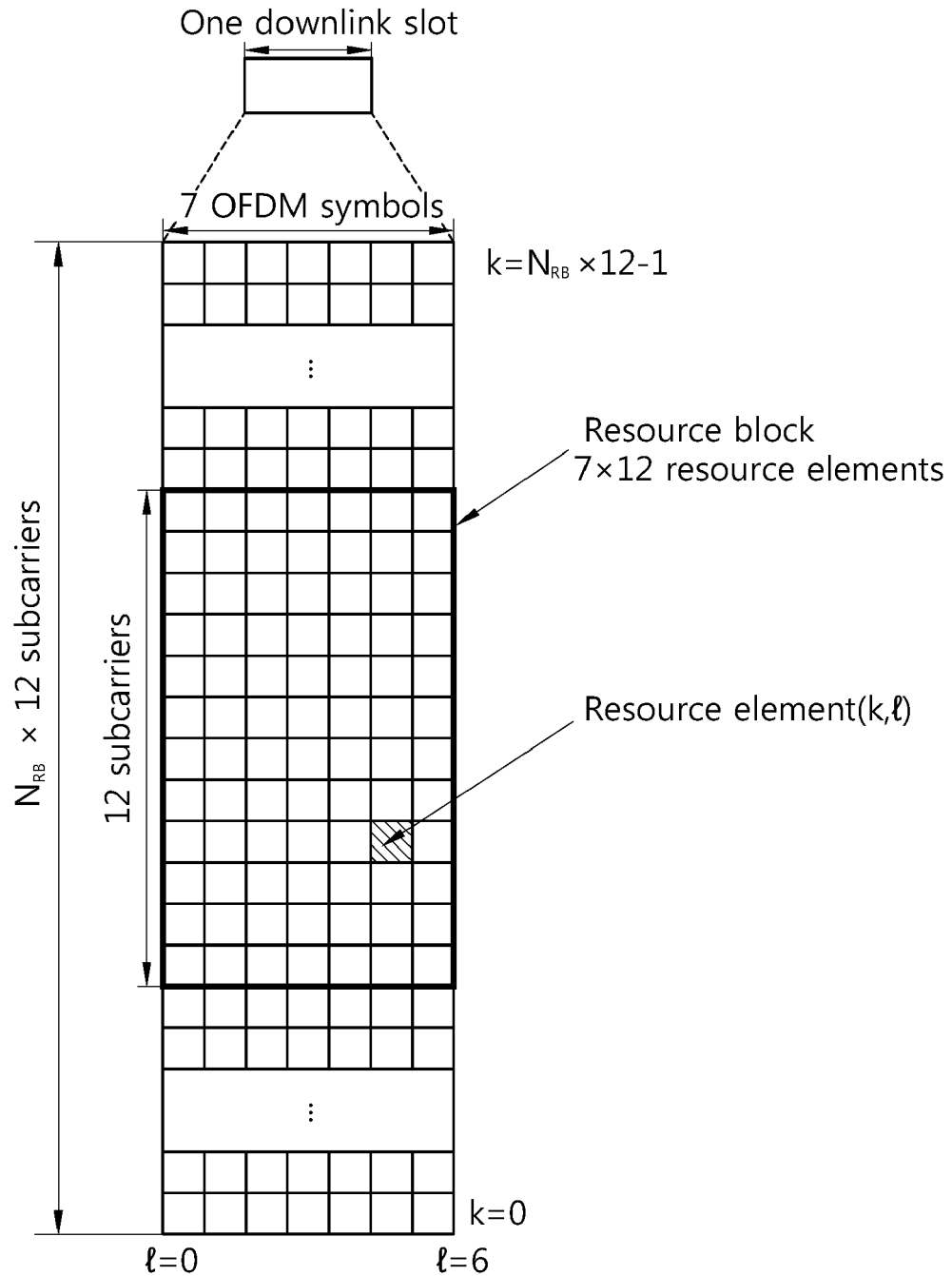
FIG. 4 shows an exemplary resource grid for one downlink slot.

FIG. 4 shows the structure of a downlink subframe.

The downlink subframe includes two slots in the time domain. Each of the slots includes 7 OFDM symbols in the normal CP. A maximum of three OFDM symbols of the first slot within the subframe correspond to a control region to which control channels are allocated, and the remaining OFDM symbols correspond to a data region to which Physical Downlink Shared Channels (PDSCHs) are allocated. Downlink control channels used in the 3GPP LTE include a Physical Control Format Indicator Channel (PCFICH), a Physical Downlink Control Channel (PDCCH), a Physical Hybrid-ARQ Indicator Channel (PHICH), and so on. The PCFICH transmitted in the first OFDM symbol of a subframe carries information about the number of OFDM symbols (that is, the size of a control region) which is used to transmit control channels within the subframe. The PHICH carries an Acknowledgement (ACK)/Not-Acknowledgement (NACK) signal for an uplink Hybrid Automatic Repeat Request (HARQ). In other words, an ACK/NACK signal for uplink data transmitted by a user equipment is transmitted on the PHICH. Control information transmitted through the PDCCH is called Downlink Control Information (DCI). The DCI indicates uplink or downlink scheduling information, an uplink transmission power control command for specific user equipment groups, etc.

Figure 5:
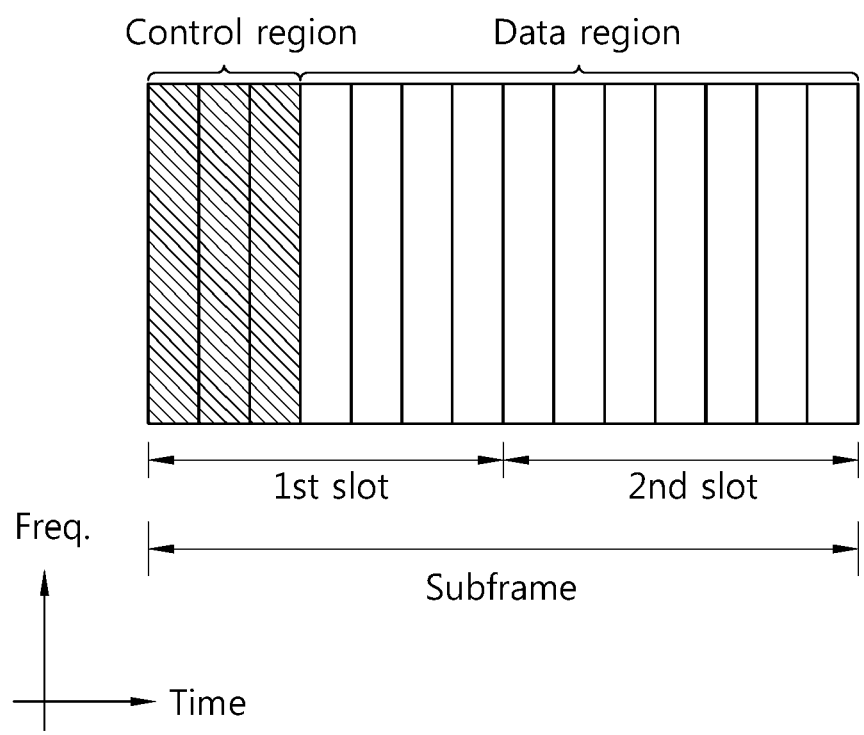
FIG. 5 shows a structure of a downlink subframe.
Figure 6:
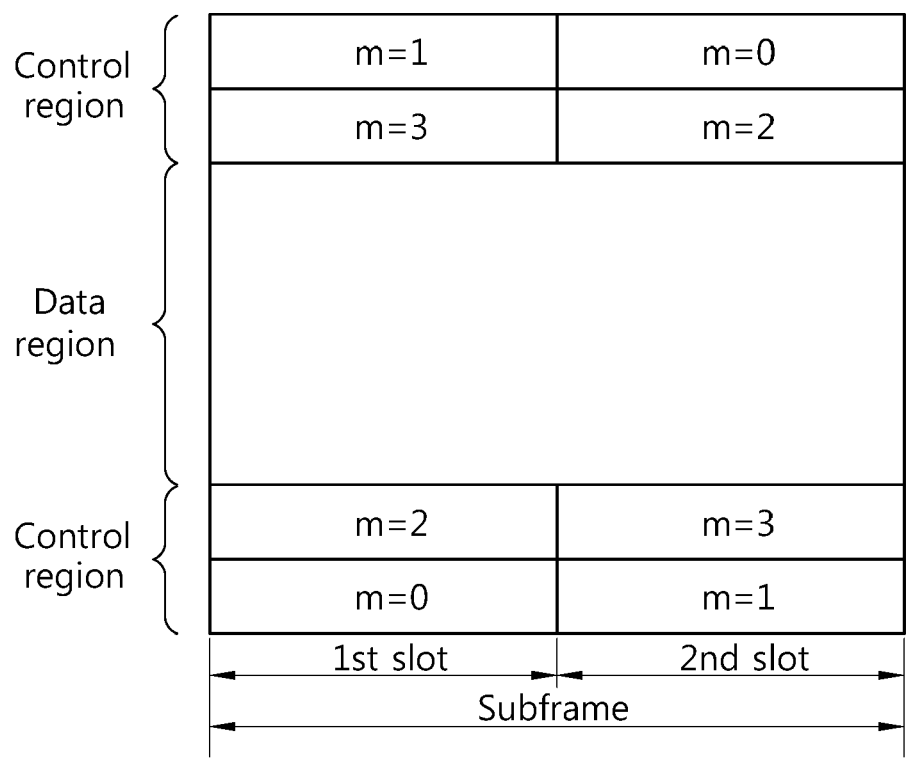
FIG. 6 shows a structure of an uplink subframe.

FIG. 5 shows the structure of an uplink subframe.

The uplink subframe can be divided into a control region and a data region in the frequency domain. The control region is allocated with a Physical Uplink Control Channel (PUCCH) on which uplink control information is transmitted. The data region is allocated with a Physical Uplink Shared Channel (PUSCH) on which data are transmitted. To maintain the characteristic of a single carrier, a user equipment does not transmit the PUCCH and the PUSCH at the same time. The PUCCHs of one user equipment forms a RB pair within a subframe and are then allocated. The RBs included in the RB pair occupy different subcarriers of respective slots. It is said that a RB pair allocated to a PUCCH is frequency-hopped at the slot boundary.

In wireless communication systems, an uplink channel or a downlink channel needs to be estimated for the purpose of the transmission and reception of data, the acquisition of system synchronization, the feedback of channel information, etc. In wireless communication system environments, fading is generated because of multi-path time delay. A process of restoring a transmission signal by compensating for the distortion of the transmission signal resulting from a sudden change in environments, caused by such fading, is referred to as channel estimation. Such channel estimation is, in general, performed using a reference signal which is known to both a transmitter and a receiver. The reference signal is also referred to as a pilot. A subcarrier used to transmit the reference signal is referred to as a reference signal subcarrier, and a resource element used to transmit data is referred to as a data subcarrier.

A certain sequence may be used as a sequence for the reference signal (hereinafter referred to as a RS sequence) without special restrictions. A sequence generated by a Phase Shift Keying (PSK)-based computer may be used as the RS sequence. PSK may include, for example, Binary Phase Shift Keying (BPSK) and Quadrature Phase Shift Keying (QPSK). In an alternative example, a Constant Amplitude Zero Auto-Correlation (CAZAC) sequence may be used as the RS sequence. The CAZAC sequence may include, for example, a Zadoff-Chu (ZC)-based sequence, a ZC sequence with cyclic extension, and a ZC sequence with truncation. In another alternative example, a Pseudo-random (PN) sequence may be used as the RS sequence. The PN sequence may include, for example, an m-sequence, a computer-generated sequence, a Gold sequence, and a Kasami sequence. In yet another alternative example, a cyclically shifted sequence may be used as the RS sequence.

A reference signal (RS) can be classified into a cell-specific RS (CRS), a Multimedia Broadcast multicast service Single Frequency Network (MBSFN) RS, and a UE-specific RS. The CRS is an RS transmitted to all UEs in a cell and is used for channel estimation. The MBSFN RS may be transmitted in a subframe allocated for MBSFN transmission. The UE-specific RS is an RS received by a specific UE (or a specific UE group) in a cell, and is mainly used by the specific UE or the specific UE group to perform data demodulation.

Figure 7:
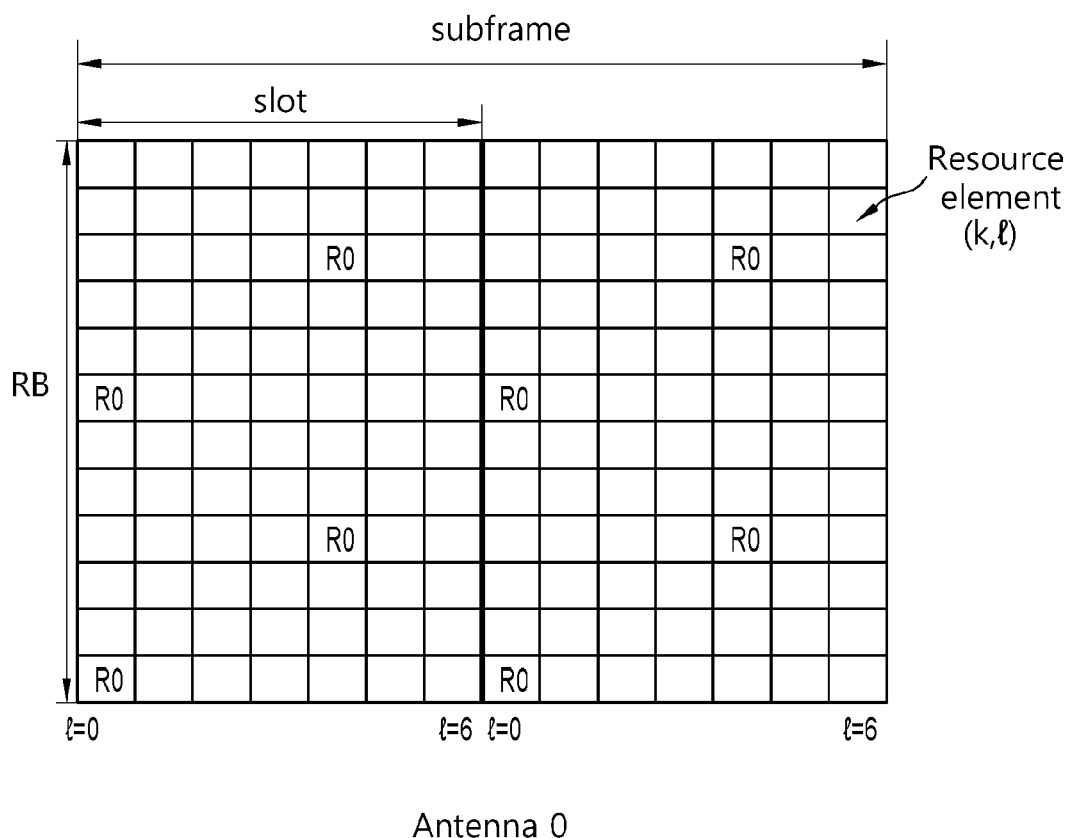
FIG. 7 shows an exemplary cell-specific reference signal (CRS) structure when a base station uses one antenna.
Figure 8:
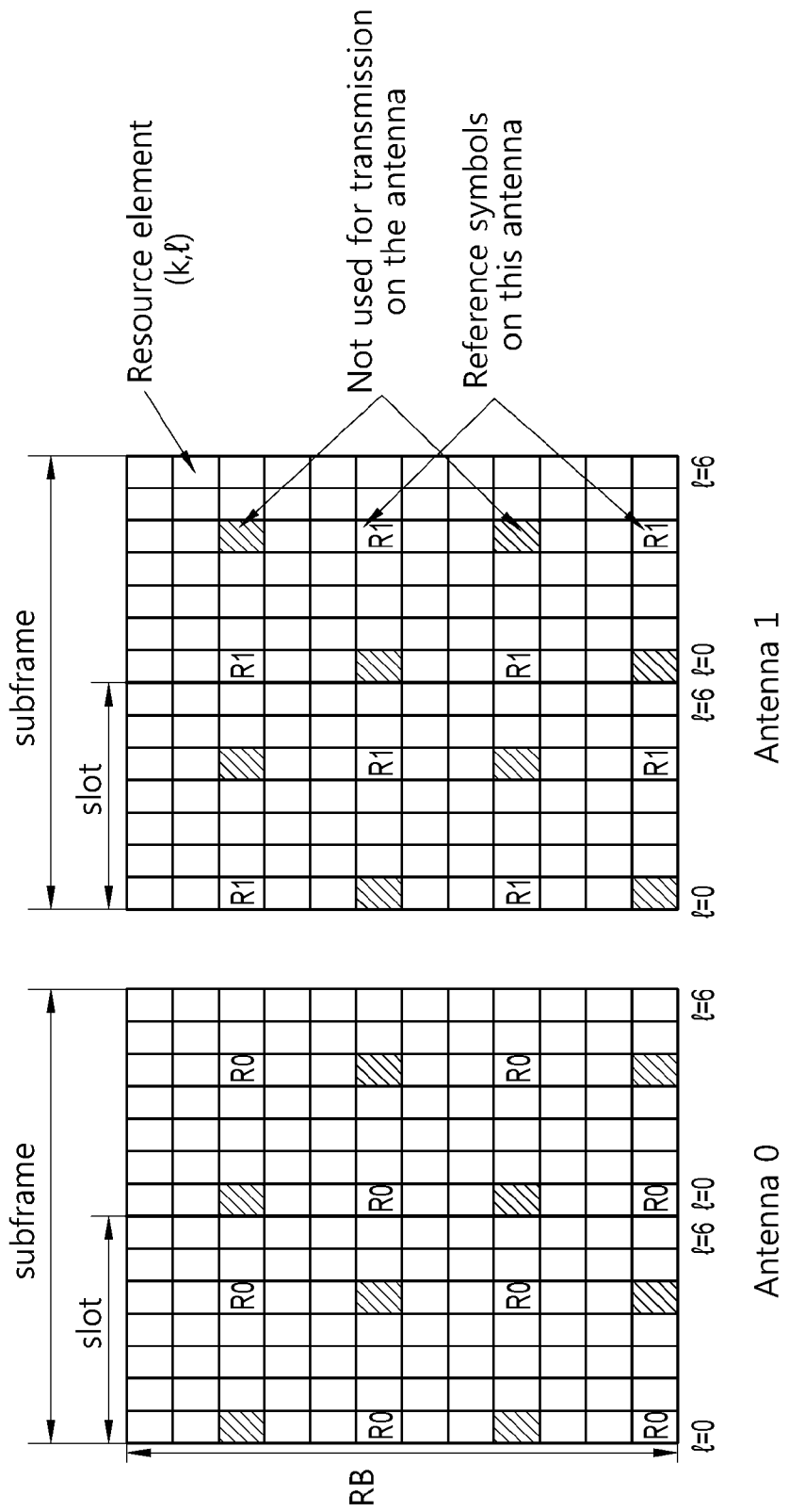
FIG. 8 shows an exemplary CRS structure when a base station uses two antennas.
Figure 9:
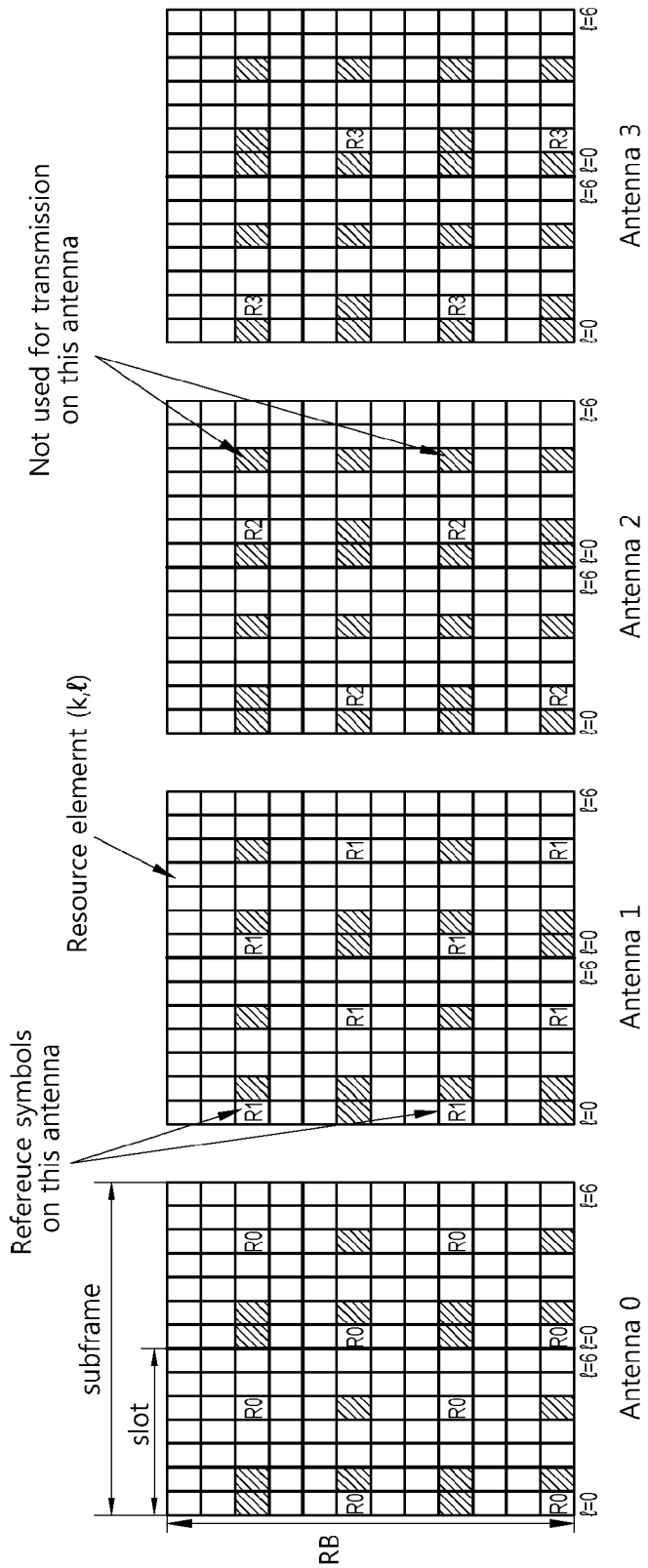
FIG. 9 shows an exemplary CRS structure when a base station uses four antennas.

FIG. 7 shows an exemplary CRS structure when a BS uses one antenna. FIG. 8 shows an exemplary CRS structure when a BS uses two antennas. FIG. 9 shows an exemplary CRS structure when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc.

Referring to FIG. 7 to FIG. 9, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2(N_{RB})$. Therefore, a length of the CRS sequence is $2(N_{RB})$.

Equation 1 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1)) \quad \text{[Math. 1]}$$

Herein, m is 0, 1, . . . , $2N_{RB,max}-1$. $N_{RB,max}$ denotes the number of resource blocks corresponding to a maximum bandwidth. For example, when using a 3GPP LTE system, $N_{RB,max}$ is 110. c(i) denotes a PN sequence as a pseudo-random sequence, and can be defined by a gold sequence having a length of 31. Equation 2 shows an example of a gold sequence c(n).

$$c(n)=(x_1(n+N_C)+x_2(n+N_C)) \bmod 2 x_1(n+31)=(x_1(n+3)+ x_1(n)) \bmod 2 x_2(n+31)=(x_2(n+3)+x_2(n+2)+x_2(n+1)+x_2(n)) \bmod 2 \quad \text{[Math.2]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $N_{RB,max}$, a certain part with a length of $2(N_{RB}$ can be selected from an RS sequence generated in a length of $2(N_{RB,max})$.

The CRS may be used in the LTE-A system to estimate channel state information (CSI). If necessary for estimation of the CSI, channel quality indicator (CQI), a precoding matrix indicator (PMI), a rank indicator (RI), or the like may be reported from the UE. A UE-specific RS may be used in the LTE-A system to demodulate a PDSCH. In this case, the PDSCH and the UE-specific RS may follow the same precoding operation.

It is difficult for a relay station to transmit and receive a signal by using the same frequency band. For example, it is difficult for the relay station to transmit an access signal while receiving a backhaul signal. This is because the access signal transmitted by the relay station and the backhaul signal received by the relay station act as interference to each other, which may result in signal distortion. This is called self interference. In addition, the relay station needs to report to UEs connected to the relay station a subframe in which the backhaul signal is received from a BS. This is to prevent the UEs from performing an unnecessary signal reception operation since the relay station cannot transmit the access signal in the subframe due to self interference. As one method of reporting the subframe by the relay station to the UE, there is a method of determining a subframe for receiving a backhaul signal as a Multimedia Broadcast multicast service Single Frequency Network (MBSFN) subframe. The relay station may report to the UE that a corresponding subframe is an MBSFN subframe by using a control signal transmitted in a duration of a first specific OFDM symbol and then may receive a backhaul signal in a duration of the remaining OFDM symbols. Such a method can be referred to as a relay method based on the MBSFN subframe.

In the LTE-A system, an LTE-A UE and a legacy UE may be used together. In a subframe for the LTE-A, a radio resource for the LTE-A UE may be effectively used for various usages, whereas a radio resource for the legacy UE may not be used or may be easily wasted. For example, if an MBSFN subframe is used as a subframe for transmitting or receiving a backhaul signal as described above, $1^{st}$ and $2^{nd}$ OFDM symbols of the MBSFN subframe of the legacy UE include a minimum possible signal (e.g., a PCFICH, a PHICH, a CRS, etc.) according to a current legacy pilot pattern. That is, the $1^{st}$ and $2^{nd}$ OFDM symbols are not used except for the usage of a control channel, and for the legacy UE, the $1^{st}$ and $2^{nd}$ OFDM symbols cannot be used for the usage of additional control signals or data.

Figure 10:
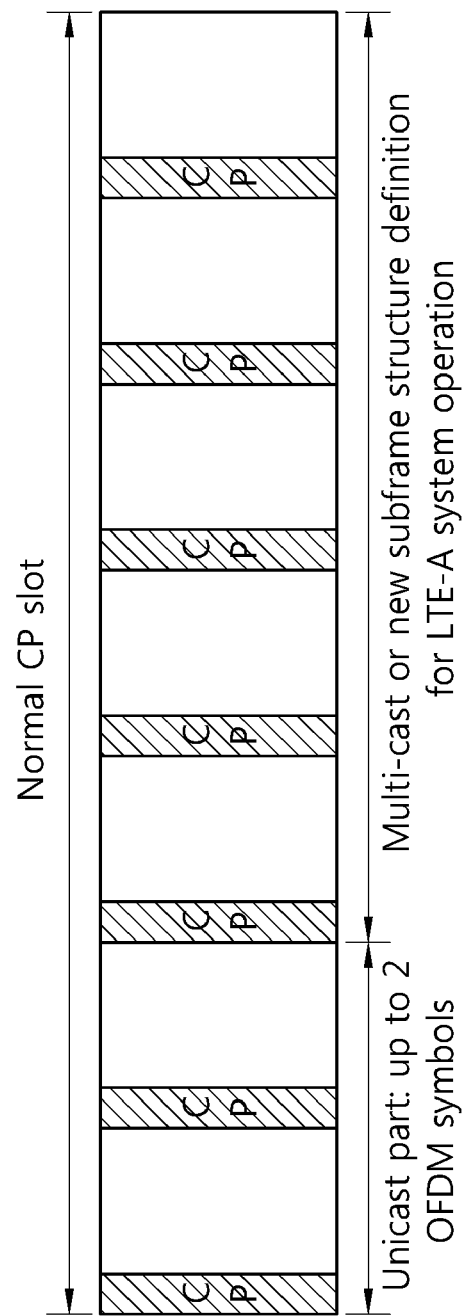
FIG. 10 and FIG. 11 show an exemplary structure of a slot constituting a Multimedia Broadcast multicast service Single Frequency Network (MBSFN) subframe.
Figure 11:
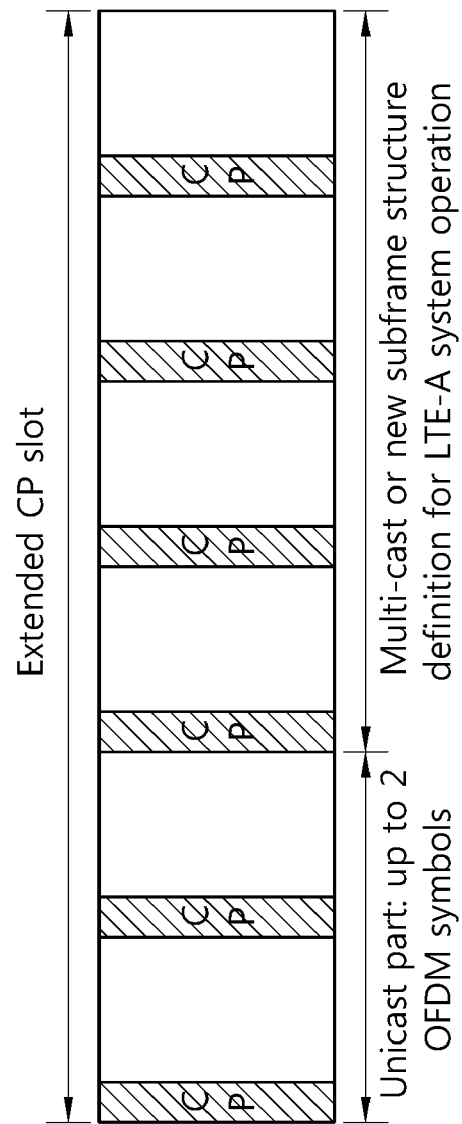

FIG. 10 and FIG. 11 show an exemplary structure of a slot constituting an MBSFN subframe. A case of using a normal CP is shown in FIG. 10, and a case of using an extended CP is shown in FIG. 11.

Referring to FIG. 10 and FIG. 11, $1^{st}$ and $2^{nd}$ OFDM symbols are unicast parts in an MBSFN subframe, and may be used as a downlink control channel for each UE. The remaining OFDM symbols other than the $1^{st}$ and $2^{nd}$ OFDM symbols may be used to support multicast or an operation of an LTE-A UE or LTE-A system. In this case, the OFDM symbols may be redesigned and thus may be effectively used to a maximum extent. On the other hand, in terms of a control channel structure and a reference signal structure, the $1^{st}$ and $2^{nd}$ OFDM symbols need to be legacy compatible. Therefore, effective resource use for the operation of the LTE-A system is restricted by the $1^{st}$ and $2^{nd}$ OFDM symbols. Accordingly, there is a need for a method of effectively utilizing resources of the $1^{st}$ and $2^{nd}$ OFDM symbols while maintaining a legacy compatible structure currently in use.

Although it will be described hereinafter that the present invention applies to an MBSFN subframe for convenience of explanation, the present invention is not limited thereto. Therefore, the present invention can also apply to an LTE-A subframe for implementing an LTE-A operation.

Examples of a factor capable of having an effect on a structure of a unicast part of an MBSFN subframe include the number of transmit antennas of a BS or a relay station, a length of a control channel, a span of acknowledgement (ACK)/non-acknowledgement (NACK) channel, etc. The length of the control channel may be indicated by a value of a PCFICH. The span of the ACK/NACK channel may be indicated by a value of a PHICH. The length of the control channel may be freely re-defined in a dynamic manner by changing the value of the PCFICH. The span of the ACK/NACK channel may be re-defined in a semi-static manner by configuring a higher layer of the PHICH. A structure of a CRS transmitted to all legacy UEs differs according to the number of transmit antennas of the BS or the relay station. For example, if the number of transmit antennas is 1 or 2, the CRS may be transmitted only in a $1^{st}$ OFDM symbol of the MBSFN subframe. If the number of antennas is 4, the CRS may occupy all of $1^{st}$ and $2^{nd}$ subframes of the MBSFN subframe. The value of the PHICH may define the ACK/NACK channel for uplink data, and may also define the number of OFDM symbols in which the PHICH is transmitted. For example, if the value of the PHICH is 1, the $2^{nd}$ OFDM symbol can be used as either a PDCCH or a PDSCH, whereas if the value of the PHICH is not 1, the $2^{nd}$ OFDM symbol has to be used as the PDCCH. In addition, since the value of the PCFICH defines the length of the PDCCH, the value of the PCFICH needs to be equal to or greater than the value of the PHICH. That is, if the value of the PHICH is 1, the value of the PCFICH may be 1 or 2, whereas if the value of the PCFICH is not 1, the value of the PCFICH has to be greater than the value of the PHICH.

Figure 12:
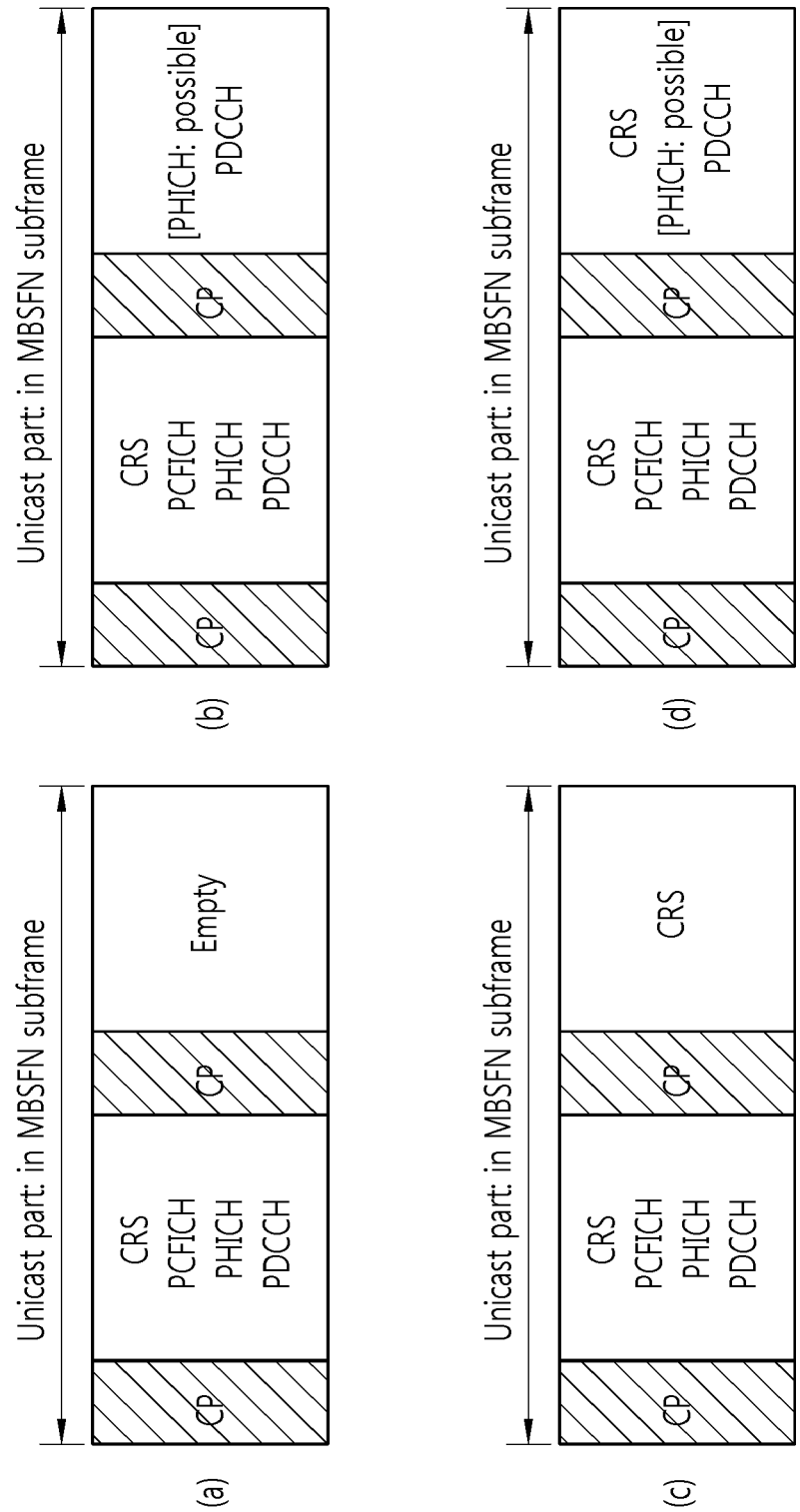
FIG. 12 shows an exemplary structure of a unicast part in an MBSFN subframe.

FIG. 12 shows an exemplary structure of a unicast part in an MBSFN subframe.

FIG. 12($a$) shows a case where the number of transmit antennas is 1 or 2 and a PDCCH is transmitted in one OFDM symbol. A CRS, a PCFICH, a PHICH, and a PDCCH are transmitted in a $1^{st}$ OFDM symbol. A downlink channel is not allocated in a $2^{nd}$ OFDM symbol. FIG. 12($b$) shows a case where the number of transmit antennas is 1 or 2 and a PDCCH is transmitted in two OFDM symbols. A CRS, a PCFICH, a PHICH, and a PDCCH are transmitted in a $1^{st}$ OFDM symbol. A $2^{nd}$ OFDM symbol is allocated for the PDCCH. If possible, the PHICH may be transmitted in the $2^{nd}$ OFDM symbol. FIG. 12($c$) shows a case where the number of transmit antennas is 4 and a PDCCH is transmitted in one OFDM symbol. A CRS, a PCFICH, a PHICH, and a PDCCH are transmitted in a $1^{st}$ OFDM symbol. A CRS is transmitted in a $2^{nd}$ OFDM symbol. FIG. 12($d$) shows a case where the number of transmit antennas is 4 and a PDCCH is transmitted in two OFDM symbols. A CRS, a PCFICH, a PHICH, and a PDCCH are transmitted in a $1^{st}$ OFDM symbol. A CRS and a PDCCH are transmitted in a $2^{nd}$ OFDM symbol. If possible, the PHICH may be transmitted in the $2^{nd}$ OFDM symbol. Referring to FIG. 12, if the $2^{nd}$ OFDM symbol is allocated for the PDCCH, effective use of radio resources for an additional LTE-A operation is restricted. On the other hand, in case of FIG. 12($a$) or FIG. 12($c$) where the PDCCH is not transmitted in the $2^{nd}$ OFDM symbol, the $2^{nd}$ OFDM symbol may be newly designed or positioned for the LTE-A operation to have an advantage of performance improvement.

Hereinafter, the proposed invention will be described and applied on the basis of the structure of the unicast part of FIG. 12($a$) or FIG. 12($c$). The present invention proposes transmission of a signal for an LTE-A operation in a $2^{nd}$ OFDM symbol constituting a unicast part of an MBSFN subframe. Alternatively, the present invention proposes transmission of data by mapping the data to a subcarrier to which the signal for the LTE-A operation is not mapped in the $2^{nd}$ OFDM symbol. In this case, a duration of a PHICH and a control format indicator (CFI) value which is one part of control information of a PCFICH can be set to 1. However, the present invention is not limited thereto and thus can apply not only to the structure of the unicast part of FIG. 12($b$) or FIG. 12($d$) as long as it does not interfere with a pre-configured PDCCH, but also to other structures.

FIG. 12($a$) shows a case where the number of transmit antennas is 1 or 2 and a PDCCH is transmitted in one OFDM symbol. A CRS, a PCFICH, a PHICH, and a PDCCH are transmitted in a 1st OFDM symbol. A downlink channel is not allocated in a 2nd OFDM symbol. FIG. 12(b) shows a case where the number of transmit antennas is 1 or 2 and a PDCCH is transmitted in two OFDM symbols. A CRS, a PCFICH, a PHICH, and a PDCCH are transmitted in a 1st OFDM symbol. A 2nd OFDM symbol is allocated for the PDCCH. If possible, the PHICH may be transmitted in the 2nd OFDM symbol. FIG. 12(c) shows a case where the number of transmit antennas is 4 and a PDCCH is transmitted in one OFDM symbol. A CRS, a PCFICH, a PHICH, and a PDCCH are transmitted in a 1st OFDM symbol. A CRS is transmitted in a 2nd OFDM symbol. FIG. 12(d) shows a case where the number of transmit antennas is 4 and a PDCCH is transmitted in two OFDM symbols. A CRS, a PCFICH, a PHICH, and a PDCCH are transmitted in a 1st OFDM symbol. A CRS and a PDCCH are transmitted in a 2nd OFDM symbol. If possible, the PHICH may be transmitted in the 2nd OFDM symbol. Referring to FIG. 12, if the 2nd OFDM symbol is allocated for the PDCCH, effective use of radio resources for an additional LTE-A operation is restricted. On the other hand, in case of FIG. 12(a) or FIG. 12(c) where the PDCCH is not transmitted in the 2nd OFDM symbol, the 2nd OFDM symbol may be newly designed or positioned for the LTE-A operation to have an advantage of performance improvement.

Hereinafter, the proposed invention will be described and applied on the basis of the structure of the unicast part of FIG. 12(a) or FIG. 12(c). The present invention proposes transmission of a signal for an LTE-A operation in a 2nd OFDM symbol constituting a unicast part of an MBSFN subframe. Alternatively, the present invention proposes transmission of data by mapping the data to a subcarrier to which the signal for the LTE-A operation is not mapped in the 2nd OFDM symbol. In this case, a duration of a PHICH and a control format indicator (CFI) value which is one part of control information of a PCFICH can be set to 1. However, the present invention is not limited thereto and thus can apply not only to the structure of the unicast part of FIG. 12(b) or FIG. 12(d) as long as it does not interfere with a pre-configured PDCCH, but also to other structures.

Figure 13:
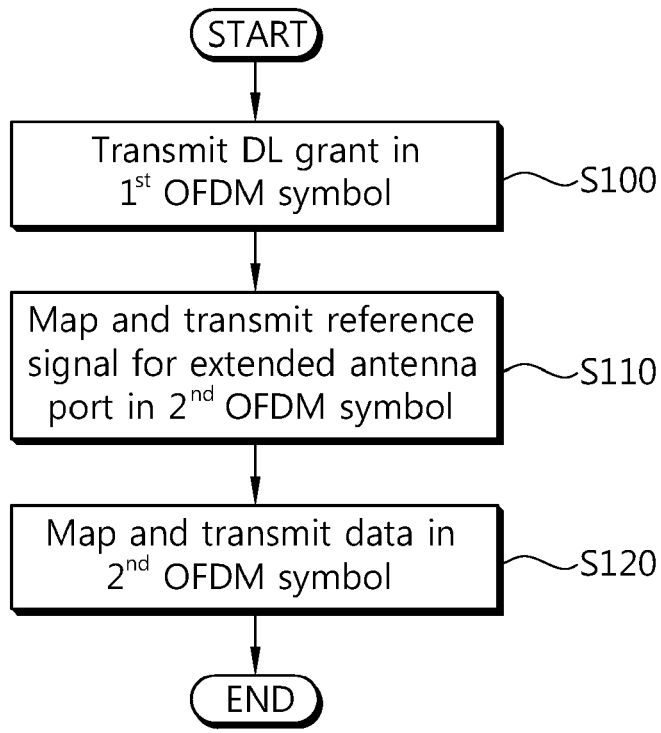
FIG. 13 is a flowchart showing an embodiment of a data transmission method proposed in the present invention.

FIG. 13 is a flowchart showing an embodiment of a data transmission method proposed in the present invention.

Step S100 is performed in a 1st OFDM symbol. In the 1st OFDM symbol, a BS transmits a CRS, PCFICH, PHICH, and PDCCH for a legacy antenna to an LTE-A UE. The PDCCH may include a downlink (DL) grant. The DL grant may include information regarding a downlink control information (DCI) format. A signal that can be transmitted in a 2nd OFDM symbol to be described below can be defined by the DCI format. In this case, the DCI format may differ from a legacy DCI format.

Step S110 is performed in the 2nd OFDM symbol. In the 2nd OFDM symbol, the BS maps a reference signal for an extended antenna supported in the LTE-A system to a subcarrier, and then transmits the resultant reference signal. The reference signal for the extended antenna may have various structures according to the number of legacy antennas and the number of subcarriers used in reference signal transmission, which will be described below.

Step S120 is performed in the 2nd OFDM symbol. The BS maps data to a subcarrier in which a reference signal for the extended antenna is not mapped, and then transmits the resultant data. The 2nd OFDM symbol may be treated as a PDSCH by the DL grant transmitted in step S100. Since data is transmitted by using an unused subcarrier, efficiency of radio resource use can be increased.

Figure 14:
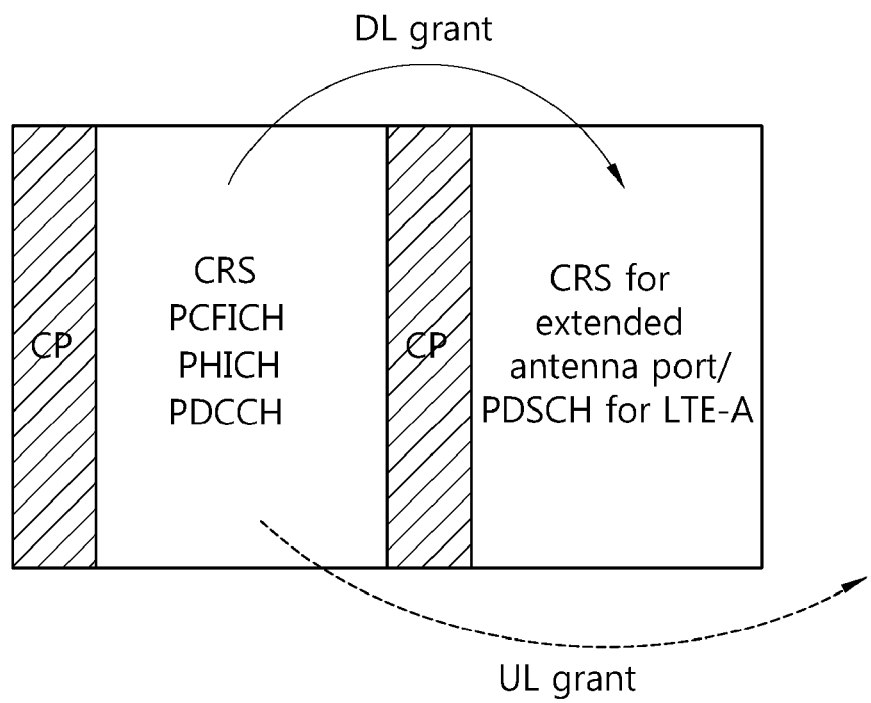
FIG. 14 shows an exemplary structure of a unicast part of an MBSFN subframe according to a data transmission method proposed in the present invention.

FIG. 14 shows an exemplary structure of a unicast part of an MBSFN subframe according to the proposed data transmission method. In a 1st OFDM symbol, a CRS, a PCFICH, a PHICH, and a PDCCH are transmitted. In a 2nd OFDM symbol, data and a reference signal for an extended antenna are transmitted. Therefore, the 2nd OFDM symbol can be treated as a PDSCH for an LTE-A system. The PDCCH may include a DL grant. The DL grant may include a DCI format. Data to be transmitted in the 2nd OFDM symbol can be determined by the DCI format included in the DL grant.

The reference signal used for the extended antenna and transmitted in the 2nd OFDM symbol may be subjected to frequency division multiplexing (FDM) or code division multiplexing (CDM). Hereinafter, the structure of the unicast part will be described by taking various examples when the LTE-A system supports 8 transmit antennas. In the following examples, the legacy reference signal structure of FIG. 8 of FIG. 9 is reused, and the reference signal for the extended antenna is transmitted in the 2nd OFDM symbol. In addition, although two resource blocks, each of which includes 12 subcarriers, are described in the following examples, this is for exemplary purposes only, and thus the number of resource blocks may vary and the number of subcarriers used in reference signal transmission may be less than the number of subcarriers used in the following examples.

Figure 15:
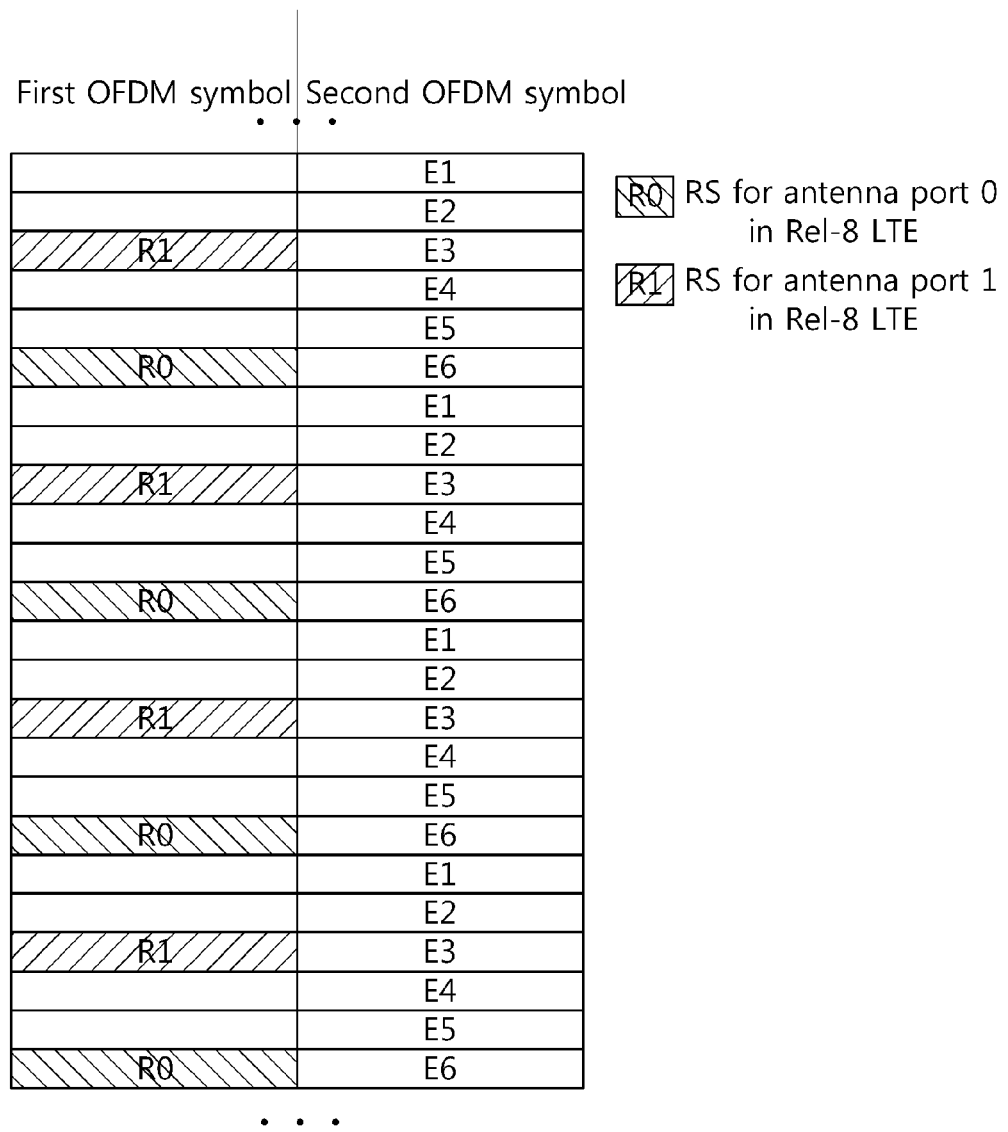

FIG. 15 shows another exemplary structure of a unicast part of an MBSFN subframe according to the proposed data transmission method. In this example, an LTE-A system includes 2 legacy antennas and 6 extended antennas. In a 1st OFDM symbol, reference signals R0 and R1 for the 2 legacy antennas are transmitted. Each of the reference signals R0 and R1 is transmitted in every 6 subcarriers and is subjected to FDM. In a 2nd OFDM symbol, reference signals E1, E2, E3, E4, E5, and E6 for the remaining 6 extended antennas for supporting LTE-A are transmitted. Each reference signal is transmitted in every 6 subcarriers and is subjected to FDM. That is, for each of the reference signals for the 6 extended antennas for supporting LTE-A, a total number of reference signals transmitted within 2 resource blocks is 4.

Figure 16:
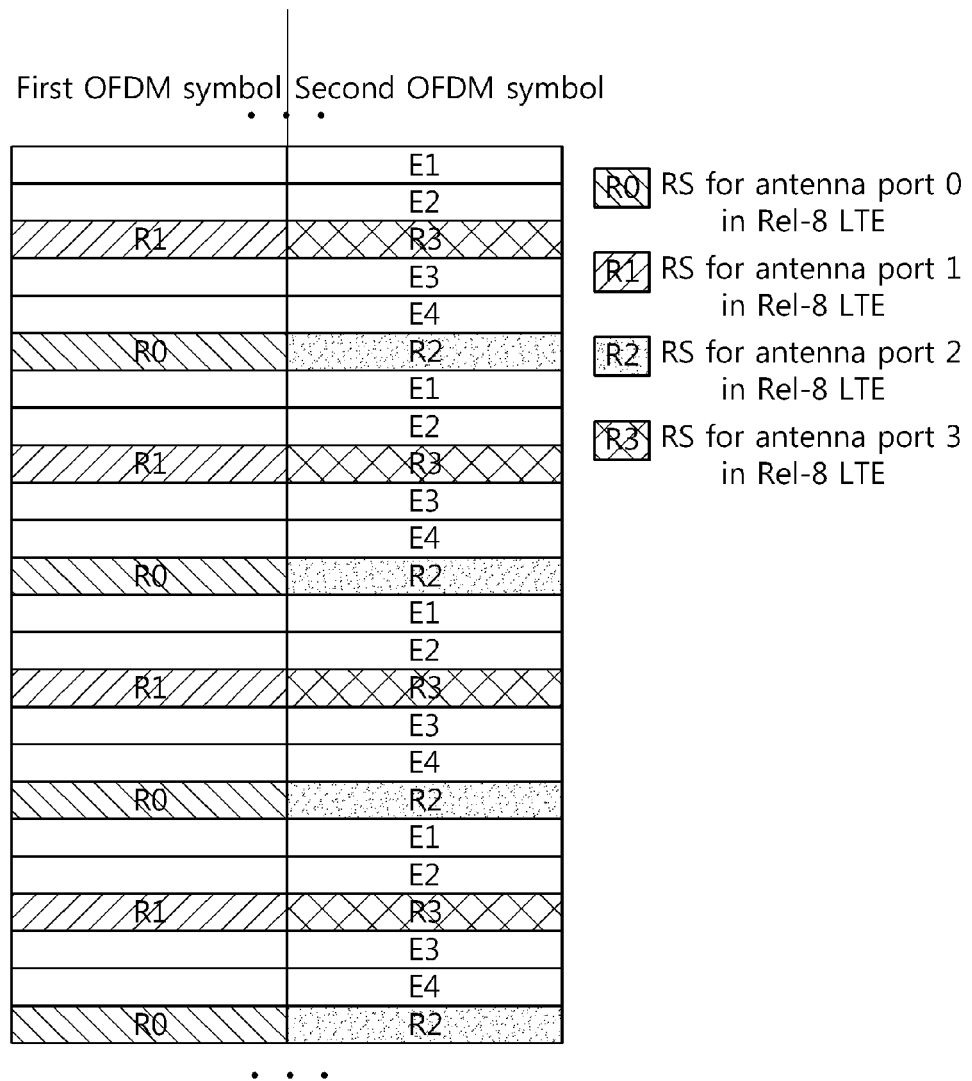

FIG. 16 shows another exemplary structure of a unicast part of an MBSFN subframe according to the proposed data transmission method. In this example, an LTE-A system includes 4 legacy antennas and 4 extended antennas. In a 1st OFDM symbol, reference signals R0 and R1 for 2 legacy antennas are transmitted. Each of the reference signals R0 and R1 is transmitted in every 6 subcarriers and is subjected to FDM. In a 2nd OFDM symbol, each of reference signals R2 and R3 for 2 legacy antennas is transmitted in every 6 subcarriers and is subjected to FDM. In addition, reference signals E1, E2, E3, and E4 for the remaining 4 extended antennas for supporting LTE-A are transmitted. Each reference signal is transmitted in every 6 subcarriers and is subjected to FDM. That is, for each of the reference signals for the 4 extended antennas for supporting LTE-A, a total number of reference signals transmitted within 2 resource blocks is 4.

Figure 17:
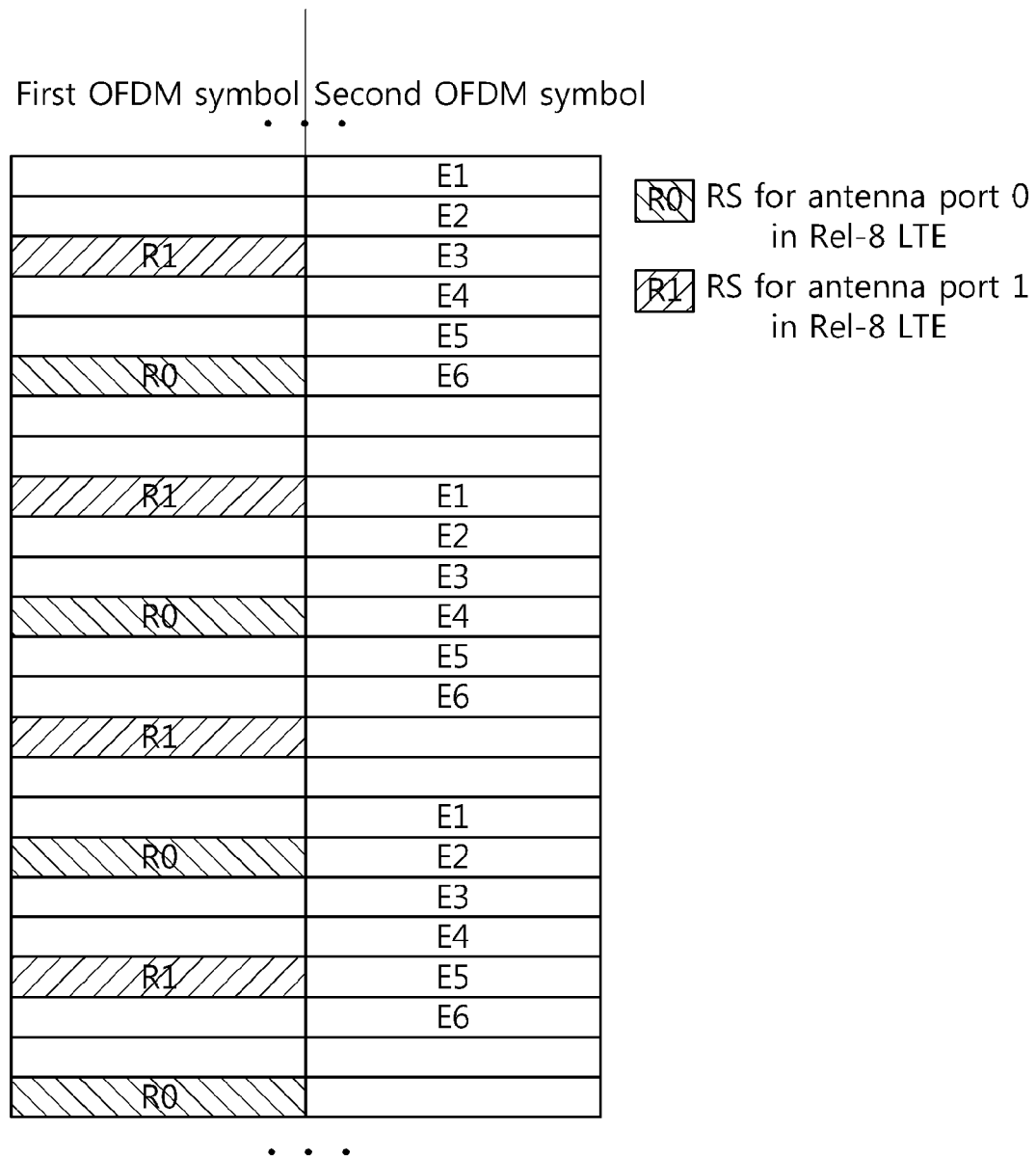

FIG. 17 shows another exemplary structure of a unicast part of an MBSFN subframe according to the proposed data transmission method. In this example, an LTE-A system includes 2 legacy antennas and 6 extended antennas. In a 1st OFDM symbol, reference signals R0 and R1 for the 2 legacy antennas are transmitted. Each of the reference signals R0 and R1 is transmitted in every 6 subcarriers and is subjected to FDM. In a 2nd OFDM symbol, reference signals E1, E2, E3, E4, E5, and E6 for the remaining 6 extended antennas for supporting LTE-A are transmitted. Each reference signal is transmitted in every 8 subcarriers and is subjected to FDM. That is, for each of the reference signals for the 6 extended antennas for supporting LTE-A, a total number of reference signals transmitted within 2 resource blocks is 3.

Figure 18:
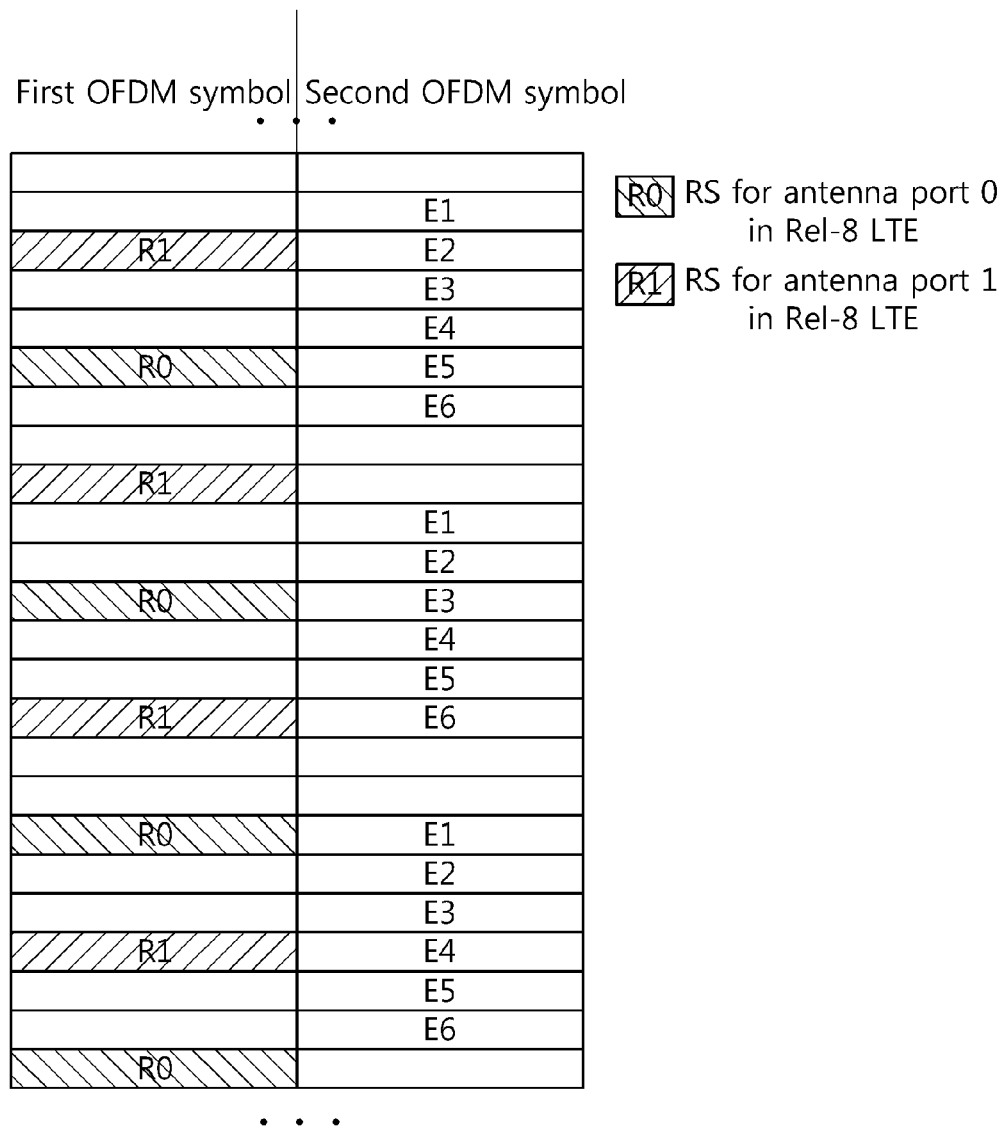

FIG. 18 shows another exemplary structure of a unicast part of an MBSFN subframe according to the proposed data transmission method. In this example, an LTE-A system includes 2 legacy antennas and 6 extended antennas. In a $1^{st}$ OFDM symbol, reference signals R0 and R1 for the 2 legacy antennas are transmitted. Each of the reference signals R0 and R1 is transmitted in every 6 subcarriers and is subjected to FDM. In a $2^{nd}$ OFDM symbol, reference signals E1, E2, E3, E4, E5, and E6 for the remaining 6 extended antennas for supporting LTE-A are transmitted. Each reference signal is transmitted in every 8 subcarriers and is subjected to FDM. That is, for each of the reference signals for the 6 extended antennas for supporting LTE-A, a total number of reference signals transmitted within 2 resource blocks is 3. When transmitted, the reference signal for the extended antenna of FIG. 18 is shifted by one subcarrier with respect to the reference signal for the extended antenna of FIG. 17. The shifting of the reference signal may apply to each of different MBSFN subframes or to each cell. The reference signal for the extended antenna can be shifted by up to 2 subcarriers.

Figure 19:
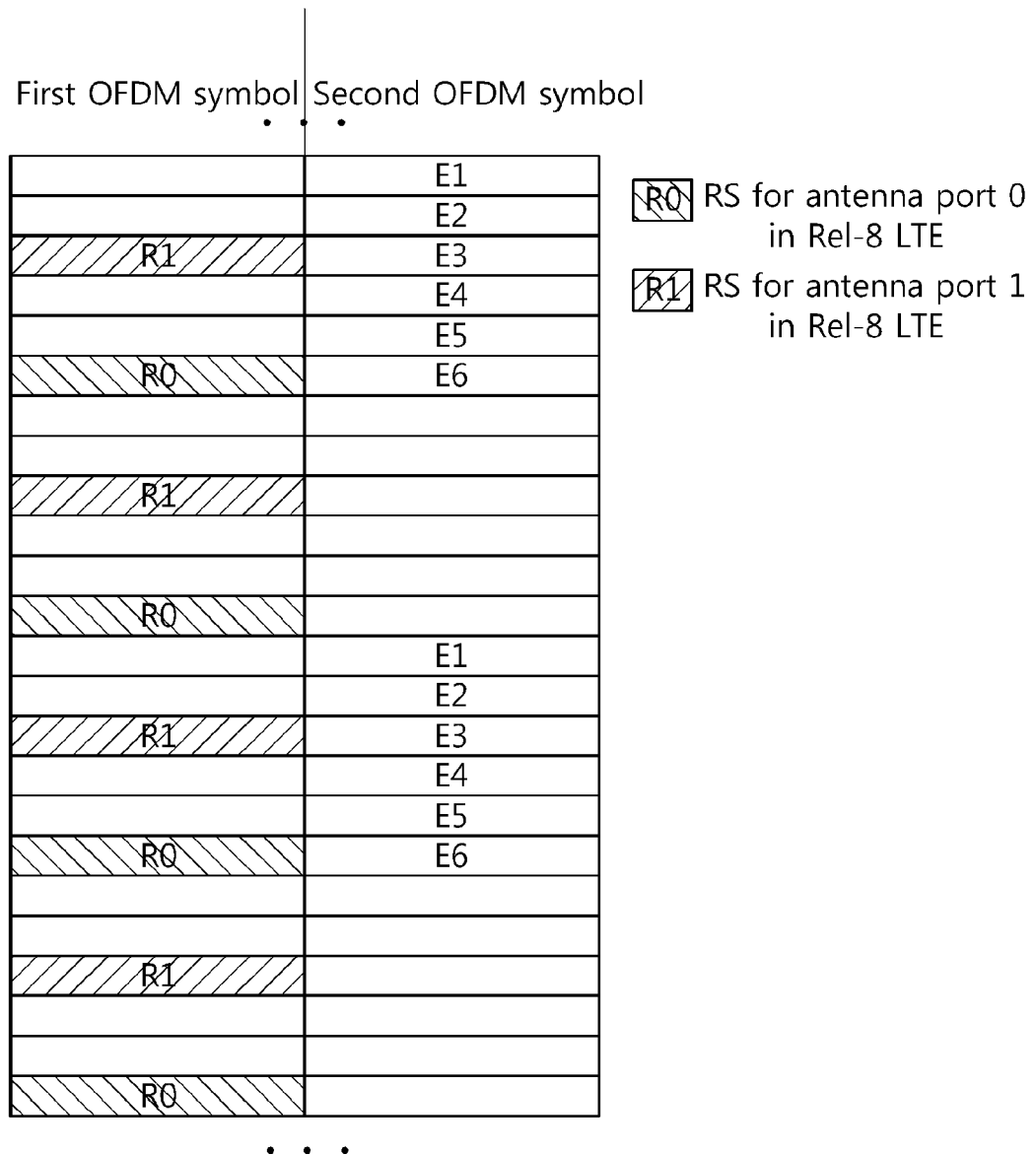

FIG. 19 shows another exemplary structure of a unicast part of an MBSFN subframe according to the proposed data transmission method. In this example, an LTE-A system includes 2 legacy antennas and 6 extended antennas. In a $1^{st}$ OFDM symbol, reference signals R0 and R1 for the 2 legacy antennas are transmitted. Each of the reference signals R0 and R1 is transmitted in every 6 subcarriers and is subjected to FDM. In a $2^{nd}$ OFDM symbol, reference signals E1, E2, E3, E4, E5, and E6 for the remaining 6 extended antennas for supporting LTE-A are transmitted. Each reference signal is transmitted in every 12 subcarriers and is subjected to FDM. That is, for each of the reference signals for the 6 extended antennas for supporting LTE-A, a total number of reference signals transmitted within 2 resource blocks is 2.

Figure 20:
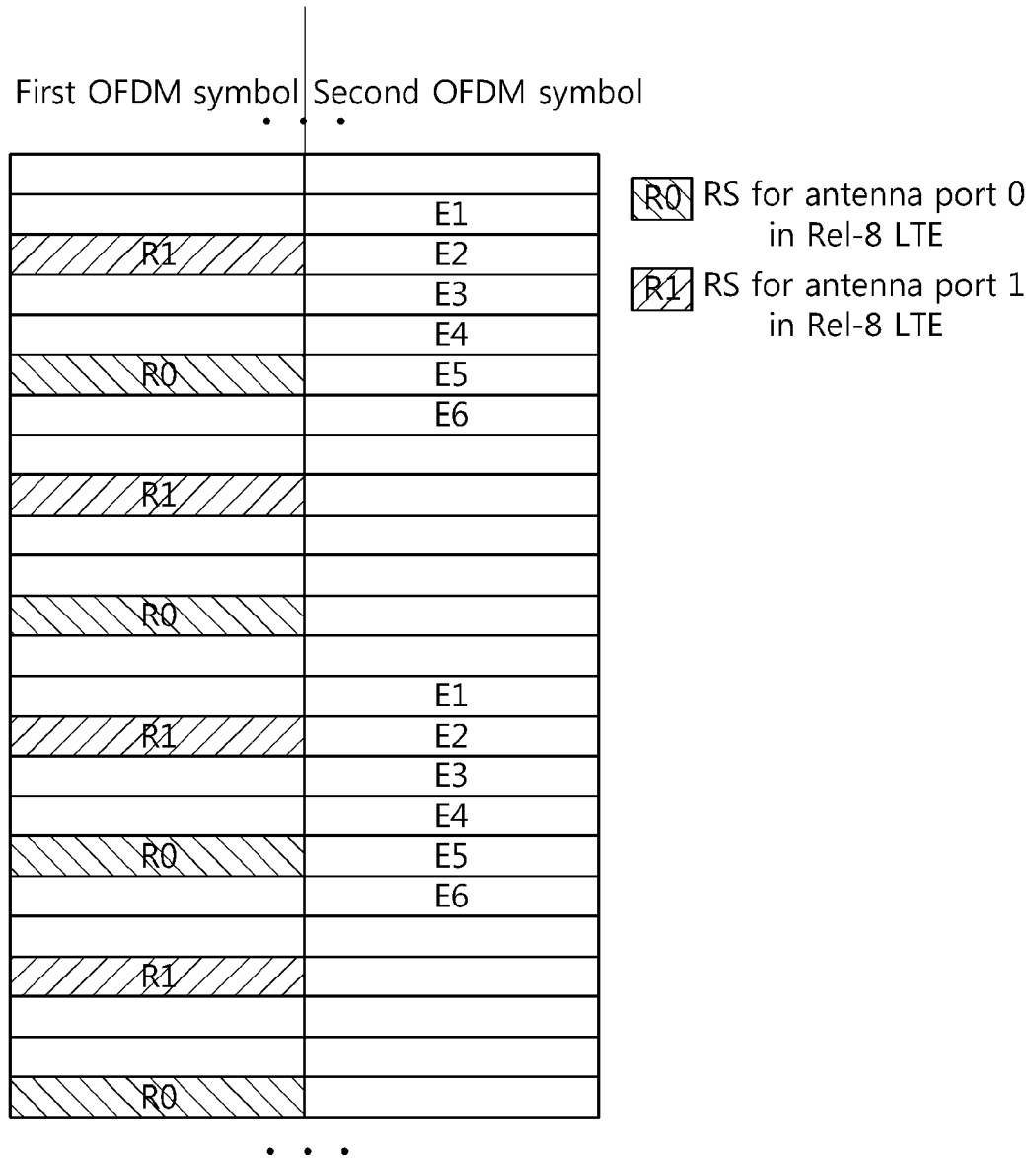

FIG. 20 shows another exemplary structure of a unicast part of an MBSFN subframe according to the proposed data transmission method. In this example, an LTE-A system includes 2 legacy antennas and 6 extended antennas. In a $1^{st}$ OFDM symbol, reference signals R0 and R1 for the 2 legacy antennas are transmitted. Each of the reference signals R0 and R1 is transmitted in every 6 subcarriers and is subjected to FDM. In a $2^{nd}$ OFDM symbol, reference signals E1, E2, E3, E4, E5, and E6 for the remaining 6 extended antennas for supporting LTE-A are transmitted. Each reference signal is transmitted in every 12 subcarriers and is subjected to FDM. That is, for each of the reference signals for the 6 extended antennas for supporting LTE-A, a total number of reference signals transmitted within 2 resource blocks is 2. When transmitted, the reference signal for the extended antenna of FIG. 20 is shifted by one subcarrier with respect to the reference signal for the extended antenna of FIG. 19. The shifting of the reference signal may apply to each of different MBSFN subframes or to each cell. The reference signal for the extended antenna can be shifted by up to 5 subcarriers.

Figure 21:
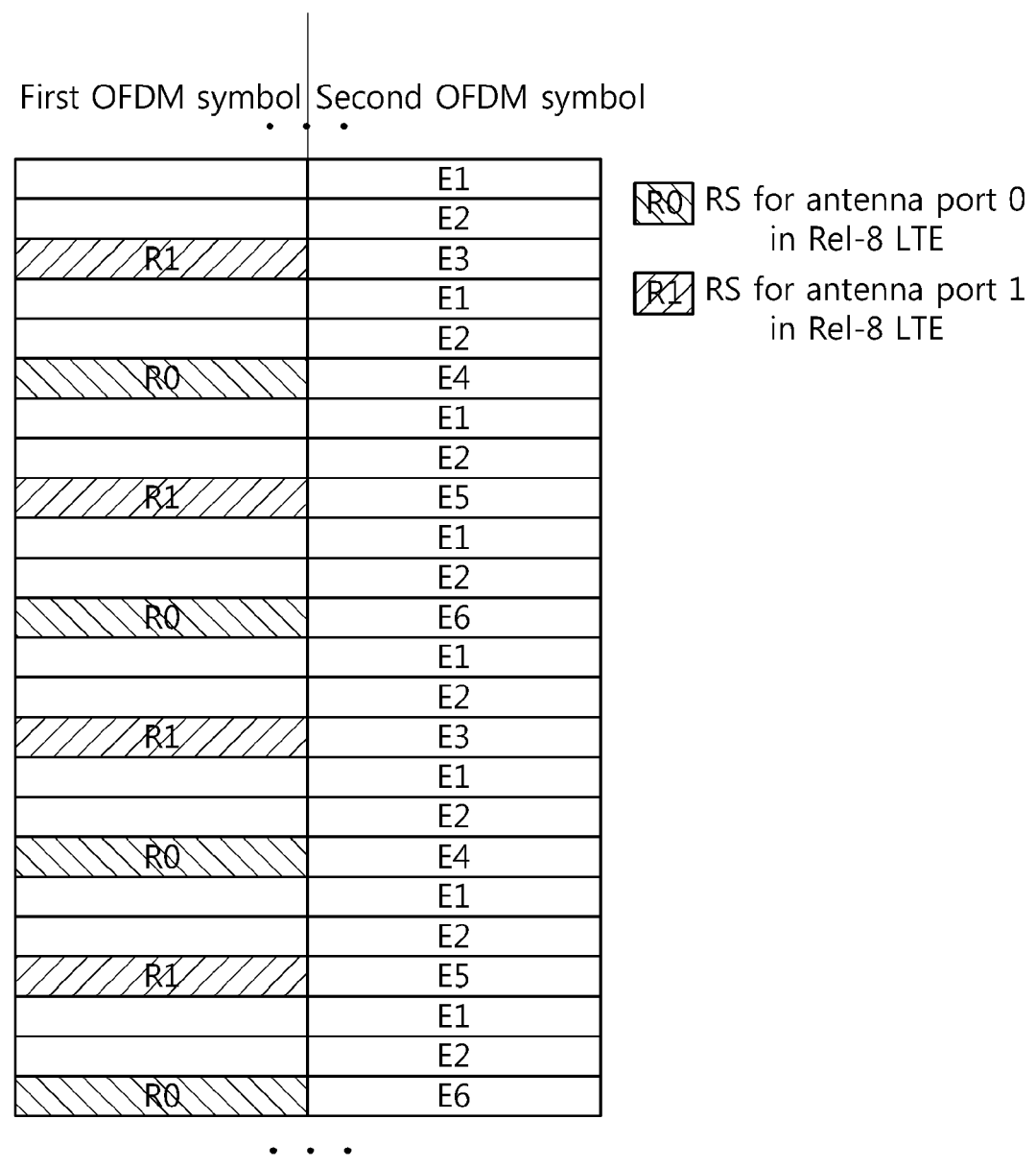

FIG. 21 shows another exemplary structure of a unicast part of an MBSFN subframe according to the proposed data transmission method. In this example, an LTE-A system includes 2 legacy antennas and 6 extended antennas. In a $1^{st}$ OFDM symbol, reference signals R0 and R1 for the 2 legacy antennas are transmitted. Each of the reference signals R0 and R1 is transmitted in every 6 subcarriers and is subjected to FDM. In a $2^{nd}$ OFDM symbol, reference signals E1, E2, E3, E4, E5, and E6 for the remaining 6 extended antennas for supporting LTE-A are transmitted. Among them, the reference signals E1 and E2 for extended antenna ports 1 and 2 are transmitted in every 3 subcarriers, and the reference signals E3, E4, E5, and E6 for extended antenna ports 3 to 6 are transmitted in every 12 subcarriers. Each reference signal is subjected to FDM.

Figure 22:
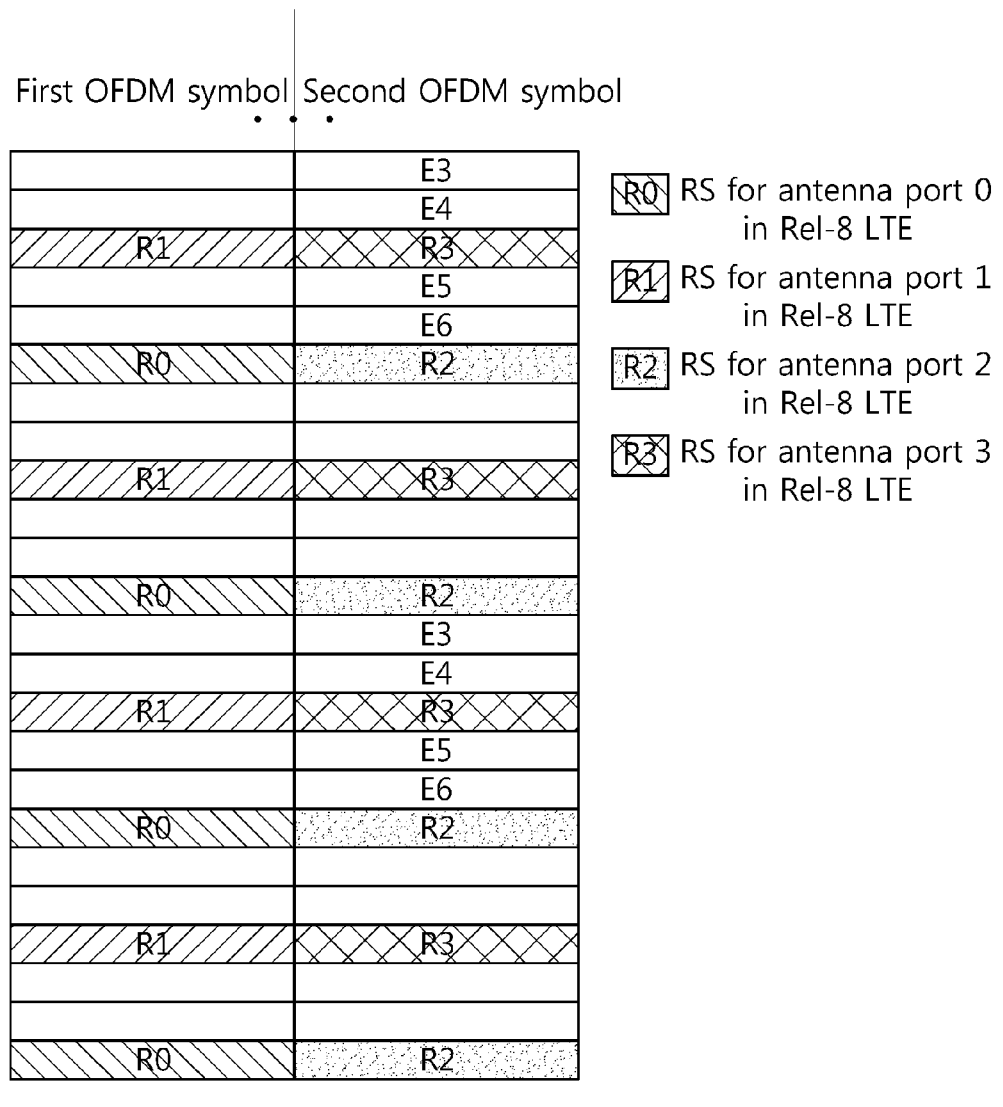

FIG. 22 shows another exemplary structure of a unicast part of an MBSFN subframe according to the proposed data transmission method. In this example, an LTE-A system includes 4 legacy antennas and 4 extended antennas. In a $1^{st}$ OFDM symbol, reference signals R0 and R1 for 2 legacy antennas are transmitted. Each of the reference signals R0 and R1 is transmitted in every 6 subcarriers and is subjected to FDM. In a $2^{nd}$ OFDM symbol, each of reference signals R2 and R3 for 2 legacy antennas is transmitted in every 6 subcarriers and is subjected to FDM. In addition, reference signals E3, E4, E5, and E6 for the remaining 4 extended antennas for supporting LTE-A are transmitted. Each of reference signals for extended antenna ports 3 to 6 is transmitted in every 12 subcarriers and is subjected to FDM. That is, for each of the reference signals for the 4 extended antennas for supporting LTE-A, a total number of reference signals transmitted within 2 resource blocks is 2.

Figure 23:
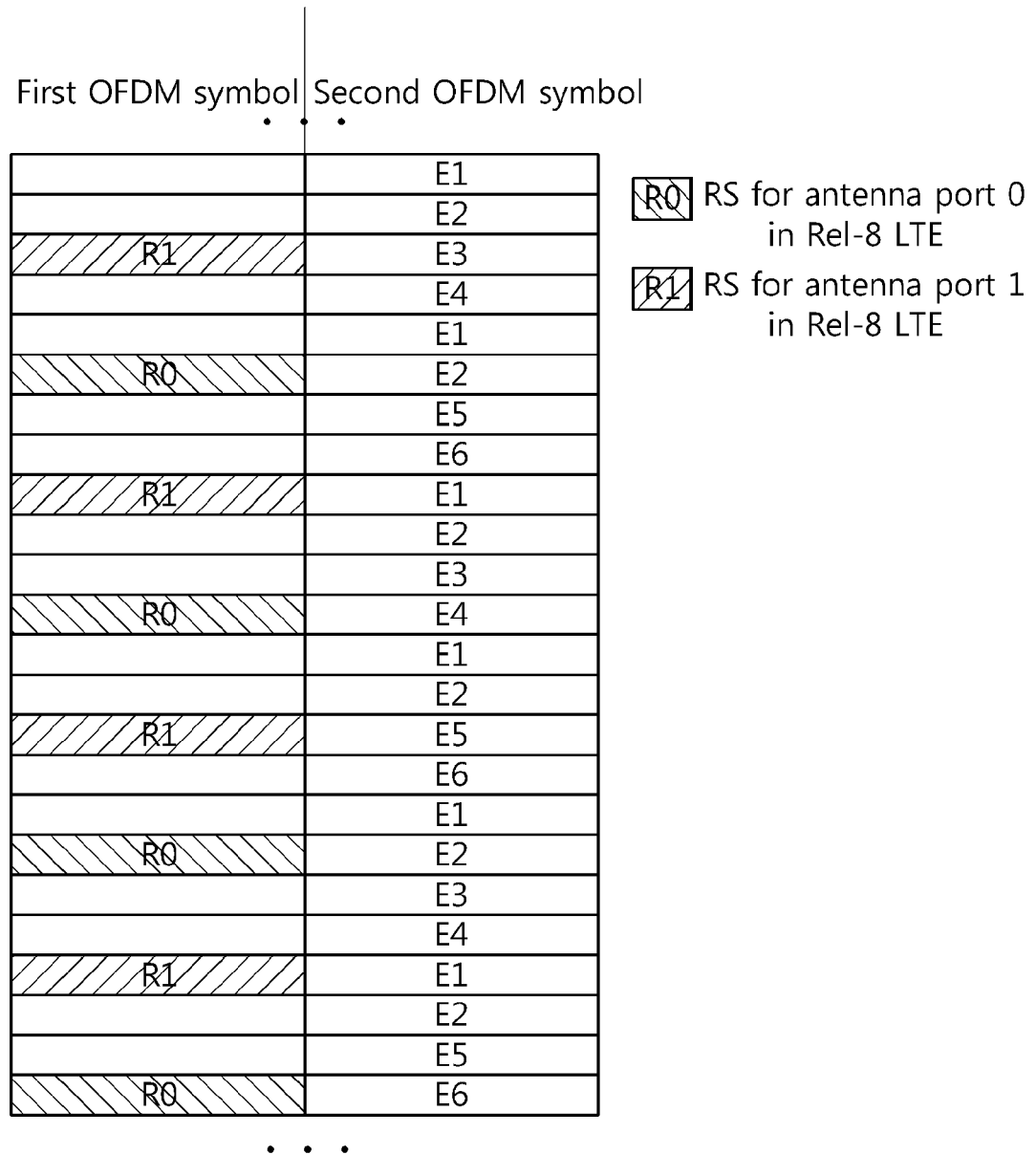

FIG. 23 shows another exemplary structure of a unicast part of an MBSFN subframe according to the proposed data transmission method. In this example, an LTE-A system includes 2 legacy antennas and 6 extended antennas. In a $1^{st}$ OFDM symbol, reference signals R0 and R1 for the 2 legacy antennas are transmitted. Each of the reference signals R0 and R1 is transmitted in every 6 subcarriers and is subjected to FDM. In a $2^{nd}$ OFDM symbol, reference signals E1, E2, E3, E4, E5, and E6 for the remaining 6 extended antennas for supporting LTE-A are transmitted. Among them, the reference signals E1 and E2 for extended antenna ports 1 and 2 are transmitted in every 4 subcarriers, and the reference signals E3, E4, E5, and E6 for extended antenna ports 3 to 6 are transmitted in every 8 subcarriers. Each reference signal is subjected to FDM.

Figure 24:
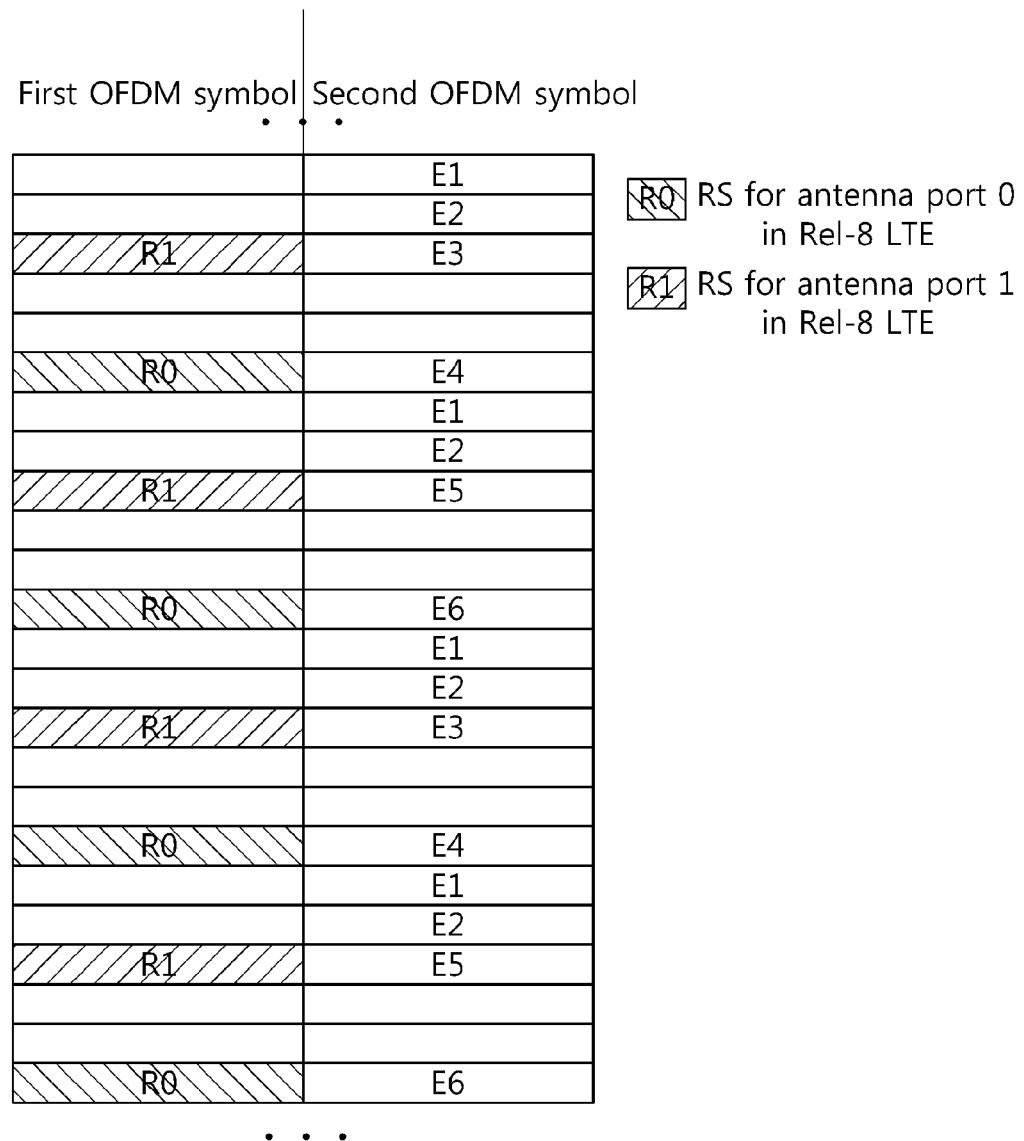

FIG. 24 shows another exemplary structure of a unicast part of an MBSFN subframe according to the proposed data transmission method. In this example, an LTE-A system includes 2 legacy antennas and 6 extended antennas. In a $1^{st}$ OFDM symbol, reference signals R0 and R1 for the 2 legacy antennas are transmitted. Each of the reference signals R0 and R1 is transmitted in every 6 subcarriers and is subjected to FDM. In a $2^{nd}$ OFDM symbol, reference signals E1, E2, E3, E4, E5, and E6 for the remaining 6 extended antennas for supporting LTE-A are transmitted. Among them, the reference signals E1 and E2 for extended antenna ports 1 and 2 are transmitted in every 6 subcarriers, and the reference signals E3, E4, E5, and E6 for extended antenna ports 3 to 6 are transmitted in every 12 subcarriers. Each reference signal is subjected to FDM.

Figure 25:
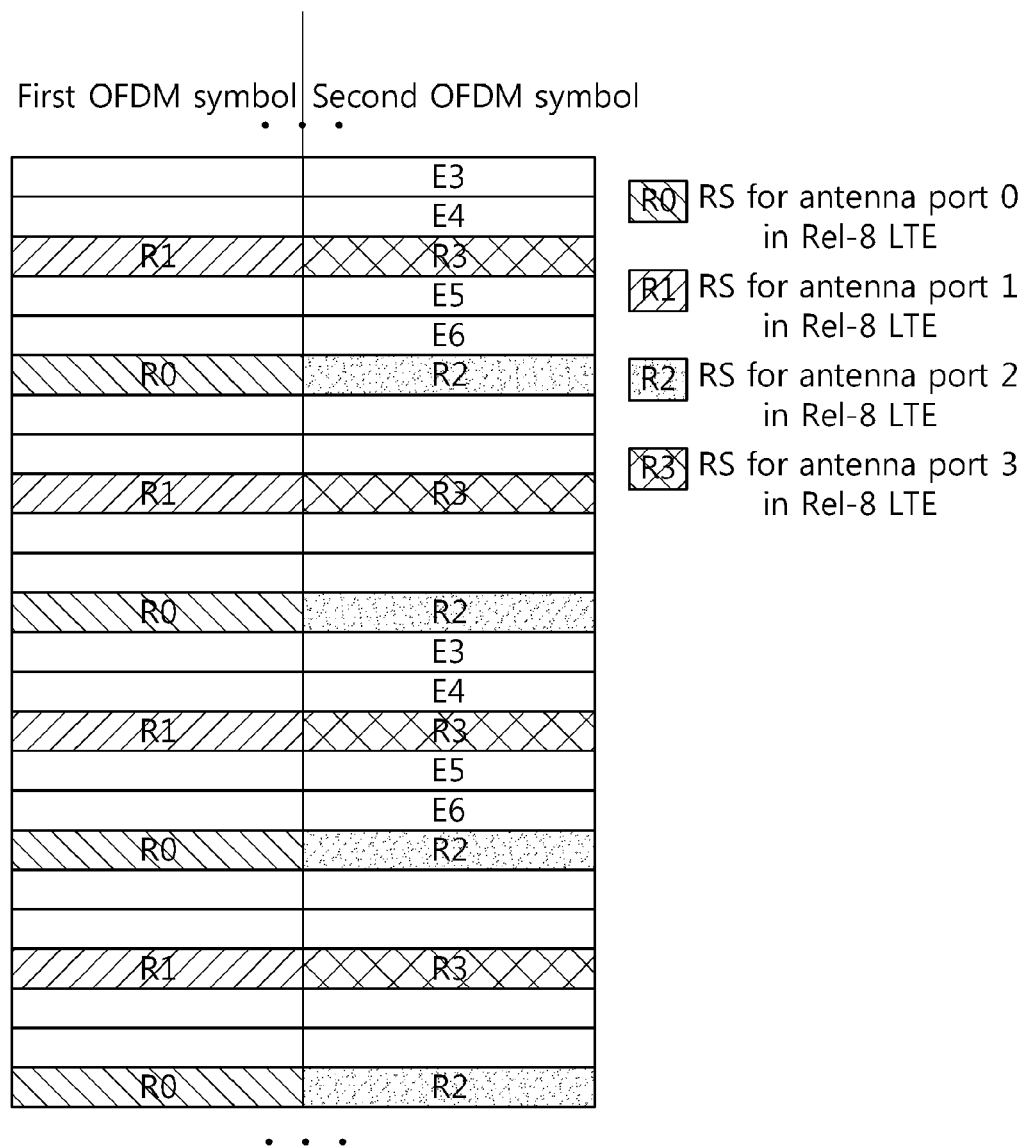

FIG. 25 shows another exemplary structure of a unicast part of an MBSFN subframe according to the proposed data transmission method. In this example, an LTE-A system includes 4 legacy antennas and 4 extended antennas. In a $1^{st}$ OFDM symbol, reference signals R0 and R1 for 2 legacy antennas are transmitted. Each of the reference signals R0 and R1 is transmitted in every 6 subcarriers and is subjected to FDM. In a $2^{nd}$ OFDM symbol, each of reference signals R2 and R3 for 2 legacy antennas is transmitted in every 6 subcarriers and is subjected to FDM. In addition, reference signals E3, E4, E5, and E6 for the remaining 4 extended antennas for supporting LTE-A are transmitted. Each of reference signals for extended antenna ports 3 to 6 is transmitted in every 12 subcarriers and is subjected to FDM. That is, for each of the reference signals for the 4 extended antennas for supporting LTE-A, a total number of reference signals transmitted within 2 resource blocks is 2.

Meanwhile, a reference signal for an extended antenna may be transmitted by performing CDM. Alternatively, the reference signal for the extended antenna may be transmitted by combining CDM and FDM. The reference signal for the extended antenna may be mapped to all available subcarriers in the $2^{nd}$ OFDM symbol and then the reference signal for the extended antenna may be transmitted. Alternatively, reference signals for all or some of extended antennas may be transmitted with respect to a specific subset among the all available subcarriers. For example, a $1^{st}$ antenna group may configure a CDM-based reference signal structure with respect to a $1^{st}$ subset among all available subcarriers in the $2^{nd}$ OFDM symbol, a $2^{nd}$ antenna group may configure another CDM-based reference signal structure with respect to a $2^{nd}$ subset not having a common element with the $1^{st}$ subset among the all available subcarriers.

Figure 26:
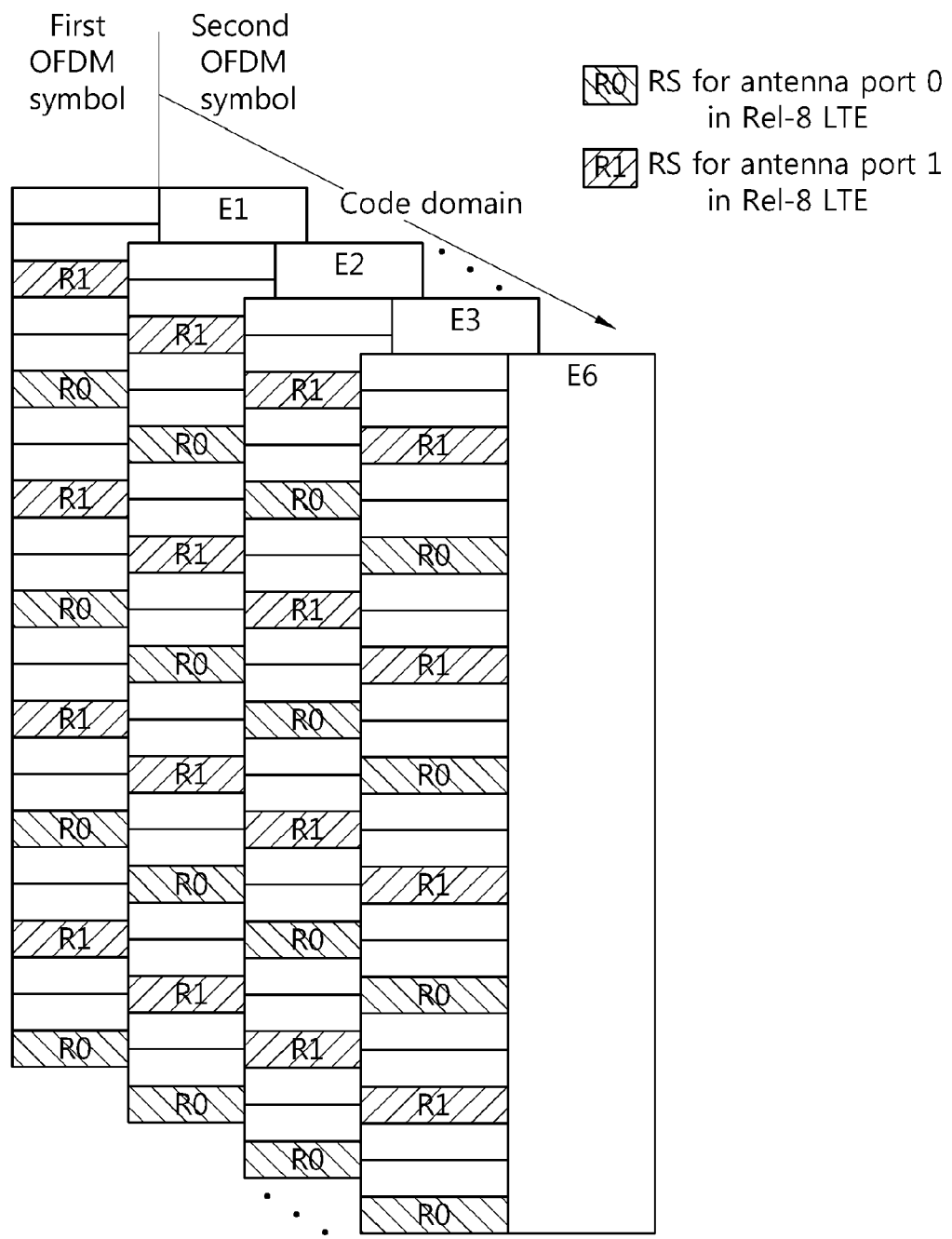

FIG. 26 shows another exemplary structure of a unicast part of an MBSFN subframe according to the proposed data transmission method. In this example, an LTE-A system includes 2 legacy antennas and 6 extended antennas. In a $1^{st}$ OFDM symbol, reference signals R0 and R1 for the 2 legacy antennas are transmitted. Each of the reference signals R0 and R1 is transmitted in every 6 subcarriers and is subjected to FDM. In a $2^{nd}$ OFDM symbol, reference signals E1, E2, E3, E4, E5, and E6 for the remaining 6 extended antennas for supporting LTE-A are transmitted. Each reference signal is transmitted in all subcarriers and is subjected to CDM.

Figure 27:
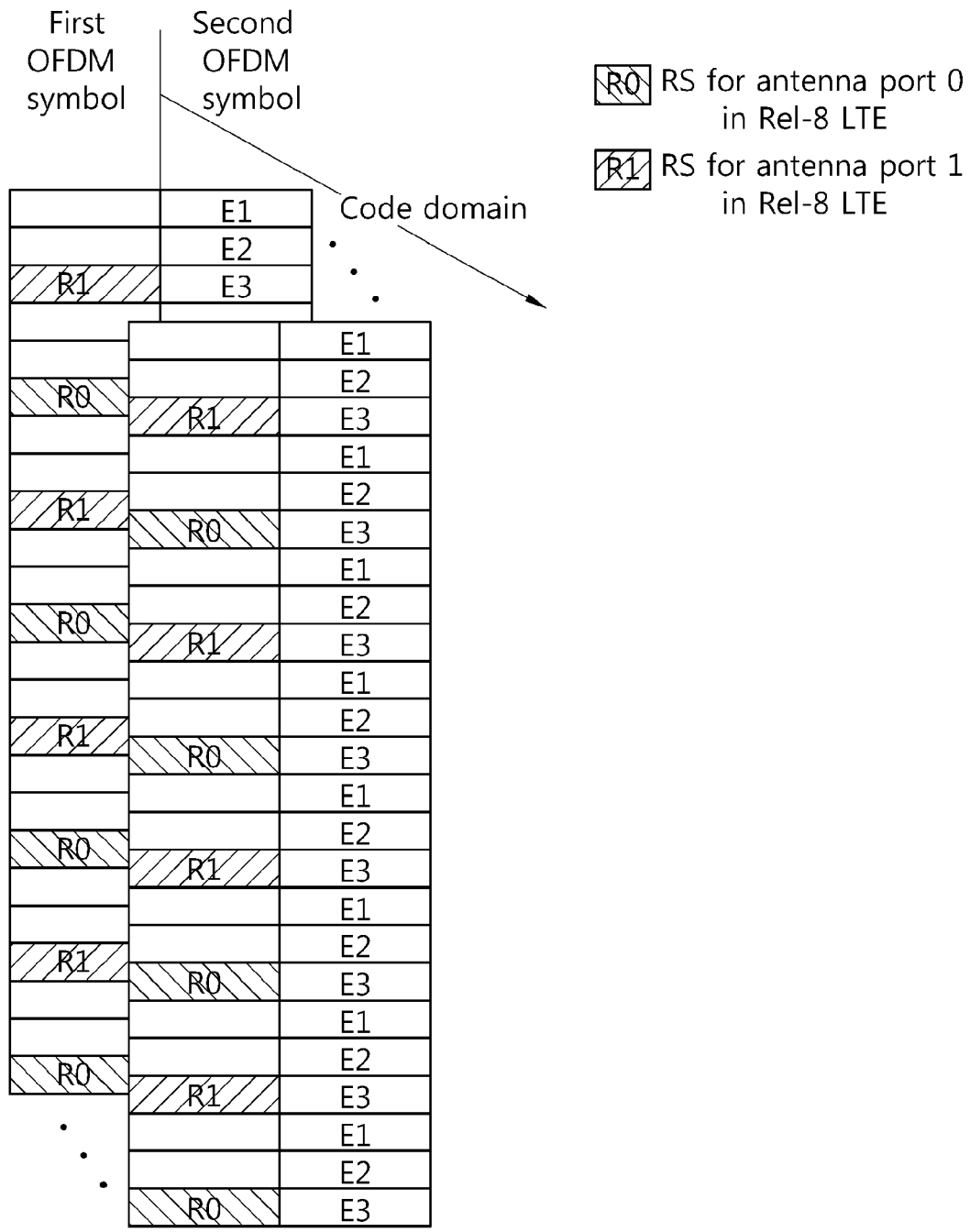

FIG. 27 shows another exemplary structure of a unicast part of an MBSFN subframe according to the proposed data transmission method. In this example, an LTE-A system includes 2 legacy antennas and 6 extended antennas. In a $1^{st}$ OFDM symbol, reference signals R0 and R1 for the 2 legacy antennas are transmitted. Each of the reference signals R0 and R1 is transmitted in every 6 subcarriers and is subjected to FDM. In a $2^{nd}$ OFDM symbol, reference signals E1, E2, and E3 for the remaining 6 extended antennas for supporting LTE-A are transmitted. Each reference signal may be a reference signal for 2 different extended antennas among the 6 extended antennas. For example, the reference signal E1 may be a reference signal for extended antenna ports 3 and 4, the reference signal E2 may be a reference signal for extended antenna ports 5 and 6, and the reference signal E3 may be a reference signal for extended antenna ports 7 and 8. Each reference signal is subjected to CDM. In the same code, each reference signal is subjected to FDM.

Figure 28:
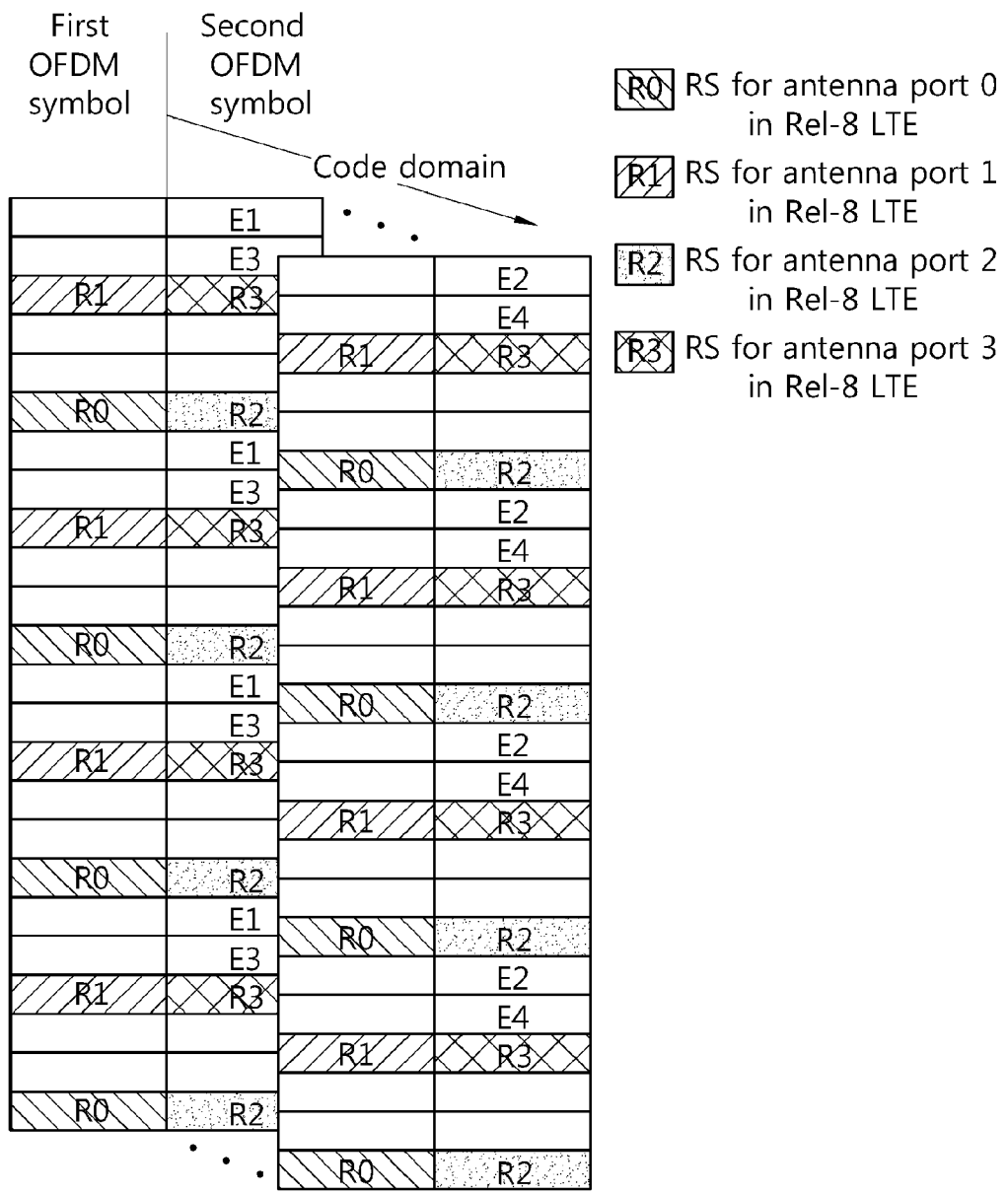

FIG. 28 shows another exemplary structure of a unicast part of an MBSFN subframe according to the proposed data transmission method. In this example, an LTE-A system includes 4 legacy antennas and 4 extended antennas. In a $1^{st}$ OFDM symbol, reference signals R0 and R1 for 2 legacy antennas are transmitted. Each of the reference signals R0 and R1 is transmitted in every 6 subcarriers and is subjected to FDM. In a $2^{nd}$ OFDM symbol, each of reference signals R2 and R3 for 2 legacy antennas is transmitted in every 6 subcarriers and is subjected to FDM. In addition, reference signals E1, E2, E3, and E4 for the remaining 4 extended antennas for supporting LTE-A are transmitted. The reference signals E1 and E2 are subjected to CDM. The reference signals E3 and E4 are also subjected to CDM. In addition, in the same code, the reference signals E1 and E3 are subjected to FDM, and the reference signals E2 and E4 are subjected to FDM.

Figure 29:
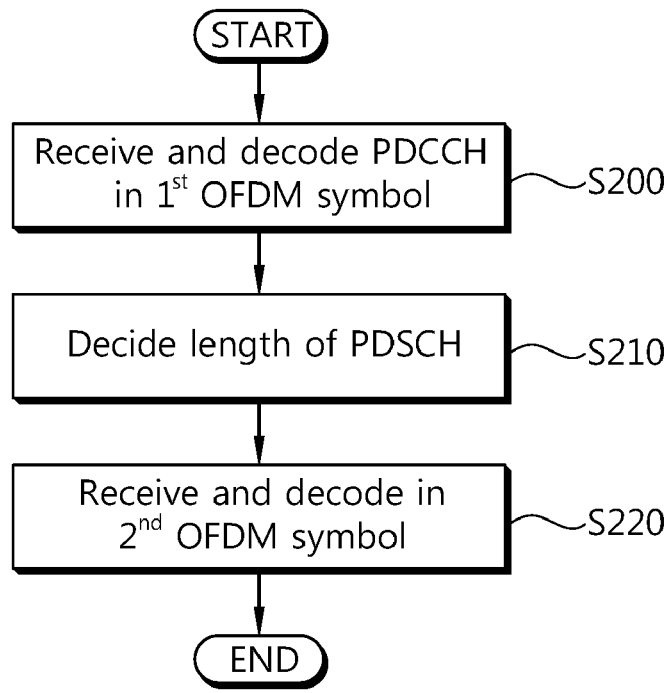
FIG. 29 is a flowchart showing an embodiment of a data processing method proposed in the present invention.

FIG. 29 is a flowchart showing an embodiment of a data processing method proposed in the present invention.

Step S200 is performed in a $1^{st}$ OFDM symbol. In the $1^{st}$ OFDM symbol, a UE receives a PDCCH of an MBSFN subframe from a BS or a relay station and then decodes the received PDCCH. Whether a corresponding subframe is the MBSFN subframe may be indicated by system information. The PDCCH may include a DL grant.

In step S210, the UE determines a length of a PDSCH. After decoding the PDCCH, the UE needs to consider whether the length of the PDSCH of the MBSFN subframe is equal to or greater than the $1^{st}$ OFDM symbol. This may be indicated by the DL grant transmitted by the BS. Alternatively, a type of the MBSFN subframe is indicated by higher-layer signaling or a broadcast message. The type of the MBSFN subframe can be classified into a multimedia broadcast multicast service (MBMS) subframe, an LTE-A subframe, an MBMS subframe used for purposes other than the MBMS usage, etc. Accordingly, the UE can easily know the length of the PDSCH in the MBSFN subframe.

Step S220 is performed in a $2^{nd}$ OFDM symbol. In the $2^{nd}$ OFDM symbol, the UE receives a PDSCH from the BS and decodes the received PDSCH.

Meanwhile, the UE has to be able to transmit ACK/NACK for the PDSCH in a predetermined uplink subframe. When the UE receives a downlink signal in an $n^{th}$ subframe in an LTE system, it is defined that the ACK/NACK for the downlink signal is transmitted in an $(n+4)^{th}$ uplink subframe. However, if the MBSFN subframe is transmitted for backhaul link transmission in an LTE-A system employing a relay station, the BS or the relay station cannot receive a signal transmitted from the UE in a corresponding subframe. Therefore, there is a need to define ACK/NACK timing different from the conventional one. In this case, delay of the ACK/NACK timing may be indicated by the DL grant, or the ACK/NACK timing may be pre-defined in a corresponding MBSFN subframe, Likewise, a timing problem may also occur when the UE receives an uplink (UL) grant in the MBSFN subframe from the BS or the relay station. In this case, a proper position of the uplink subframe may be indicated by the UL grant, or may be determined according to a higher layer or a type of an MBSFN subframe indicated in advance.

Figure 30:
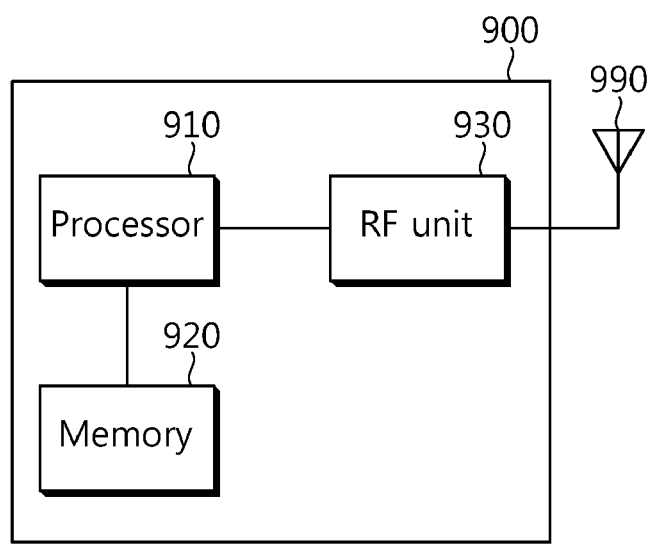
FIG. 30 is a block diagram showing a base station for implementing an embodiment of the present invention.

FIG. 30 is a block diagram showing a BS for implementing an embodiment of the present invention. A receiver 900 includes a processor 910, a memory 920, and a radio frequency (RF) unit 930.

The processor 910 implements proposed functions, processes, and/or methods. The processor 910 transmits a PDCCH to a UE in a $1^{st}$ OFDM symbol, transmits a reference signal for an extended antenna port to the UE in a $2^{nd}$ OFDM symbol by mapping the reference signal to a subcarrier, and transmits a PDSCH to the UE in the $2^{nd}$ OFDM symbol by mapping the PDSCH to the remaining subcarriers other than the subcarrier to which the reference signal is mapped. The memory 920 is coupled to the processor 910 and stores a variety of information for driving the processor 910. The RF unit 930 is coupled to the processor 910, and transmits and/or receives radio signals.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting data in a Multimedia Broadcast multicast service Single Frequency Network (MBSFN) subframe in a wireless communication system, the method comprising:
   transmitting a physical downlink control channel (PDCCH) to a user equipment in a first orthogonal frequency division multiplexing (OFDM) symbol;
   transmitting reference signals for a plurality of extended antenna ports to the user equipment in a second OFDM symbol by mapping the reference signals to subcarriers; and
   transmitting a physical downlink shared channel (PDSCH) to the user equipment in the second OFDM symbol by mapping the PDSCH to remaining subcarriers other than the subcarriers to which the reference signals are mapped,
   wherein each of the reference signals for the plurality of extended antenna ports is subjected to code division multiplexing (CDM), and
   wherein the reference signals for the plurality of extended antenna ports are divided into subsets not having a common element when subjected to the CDM.

2. The method of claim 1, wherein the reference signals and the PDSCH are scheduled by using a downlink control information (DCI) format transmitted through the PDCCH.

3. The method of claim 1, wherein the number of extended antenna ports is 4 or 6.

4. The method of claim 1, wherein the reference signals for the plurality of extended antenna ports have a specific spacing from each other in a frequency domain.

5. A method of processing data in a Multimedia Broadcast multicast service Single Frequency Network (MBSFN) in a wireless communication system, the method comprising:
   decoding a physical downlink control channel (PDCCH) by receiving the PDCCH from a base station or a relay station in a first orthogonal frequency division multiplexing (OFDM) symbol;
   determining a length of a physical downlink shared channel (PDSCH) according to a downlink (DL) grant transmitted on the PDCCH; and
   decoding the PDSCH by receiving the PDSCH in a second OFDM symbol,
   wherein a length of the PDSCH is one OFDM symbol.

6. A transmitter of a wireless communication system, the transmitter comprising:
   a radio frequency (RF) unit configured to transmit and receive a signal; and
   a processor coupled to the RF unit and configured to:
   transmit a physical downlink control channel (PDCCH) to a user equipment in a first orthogonal frequency division multiplexing (OFDM) symbol,
   transmit reference signals for a plurality of extended antenna ports to the user equipment in a second OFDM symbol by mapping the reference signals to subcarriers, and
   transmit a physical downlink shared channel (PDSCH) to the user equipment in the second OFDM symbol by mapping the PDSCH to remaining subcarriers other than the su carriers to which the reference signals are mapped,
   wherein each of the reference signals for the plurality of extended antenna ports is subjected to code division multiplexing (CDM), and
   wherein the reference signals for the plurality of extended antenna cods are divided into subsets not having a common element when subjected to the CDM.

7. The transmitter of claim 6, wherein the reference signals and the PDSCH are scheduled by using a downlink control information (DCI) format transmitted through the PDCCH.

* * * * *